(12) United States Patent
Rothschild et al.

(10) Patent No.: US 10,487,408 B2
(45) Date of Patent: Nov. 26, 2019

(54) METHODS AND SYSTEM FOR HYDROGEN PRODUCTION BY WATER ELECTROLYSIS

(71) Applicant: Technion Research & Development Foundation Limited, Haifa (IL)

(72) Inventors: Avner Rothschild, Haifa (IL); Gideon Grader, Haifa (IL); Gennady Shter, Nesher (IL); Avigail Landman, Haifa (IL); Hen Dotan, Olesh (IL)

(73) Assignee: Technion Research & Development Foundation Limited, Haifa (IL)

( * ) Notice: Subject to any disclaimer, the term of this patent is extended or adjusted under 35 U.S.C. 154(b) by 258 days.

(21) Appl. No.: 15/527,843

(22) PCT Filed: Nov. 19, 2015

(86) PCT No.: PCT/IL2015/051120
§ 371 (c)(1),
(2) Date: May 18, 2017

(87) PCT Pub. No.: WO2016/079746
PCT Pub. Date: May 26, 2016

(65) Prior Publication Data
US 2017/0306510 A1     Oct. 26, 2017

Related U.S. Application Data

(60) Provisional application No. 62/081,671, filed on Nov. 19, 2014.

(51) Int. Cl.
*C25B 1/04*     (2006.01)
*C25B 11/04*    (2006.01)
(Continued)

(52) U.S. Cl.
CPC ............. *C25B 1/04* (2013.01); *C25B 1/003* (2013.01); *C25B 9/00* (2013.01); *C25B 9/06* (2013.01);
(Continued)

(58) Field of Classification Search
CPC ............................ C25B 1/02–06; C25B 1/003
See application file for complete search history.

(56) References Cited

U.S. PATENT DOCUMENTS

| 3,216,919 A | 11/1965 | White et al. | |
| 4,384,928 A * | 5/1983 | Hall | C25D 9/08 204/290.03 |

(Continued)

FOREIGN PATENT DOCUMENTS

| EP | 0 053 008 A1 | 6/1982 |
| WO | WO 2006/113463 | 10/2006 |

OTHER PUBLICATIONS

Arulraj et al., "Characterization of Nickel Oxyhydroxide Based Anodes for Alkaline Water Electrolysers", Int. J. Hydrogen Energy, vol. 14, No. 12, pp. 893-898, (1989).

*Primary Examiner* — Nicholas A Smith
(74) *Attorney, Agent, or Firm* — Vorys, Sater, Seymour and Pease LLP

(57) ABSTRACT

A system and method for generating hydrogen gas from an aqueous solution are disclosed herein. The system comprises a compartment with a working electrode for reducing water in response to an applied voltage to generate hydrogen and a redox-active electrode capable of reversibly undergoing oxidation and reduction. The system may further comprise a second compartment with a working electrode for generating oxygen and redox-active electrode electrically connectable to the redox-active electrode in the first compartment. The method comprises applying a voltage between a working electrode and a redox-active electrode of a system (Continued)

described herein and/or between comprising a working electrode of one compartment and a working electrode of a second compartment of a system described herein.

12 Claims, 18 Drawing Sheets

(51) Int. Cl.
*C25B 9/00* (2006.01)
*C25B 1/00* (2006.01)
*C25B 9/06* (2006.01)
*C25B 15/02* (2006.01)
*C25B 15/00* (2006.01)

(52) U.S. Cl.
CPC .............. *C25B 11/04* (2013.01); *C25B 15/02* (2013.01); *C25B 15/00* (2013.01); *Y02E 60/368* (2013.01)

(56) References Cited

U.S. PATENT DOCUMENTS

| | | | | |
|---|---|---|---|---|
| 5,242,565 A | * | 9/1993 | Winsel | H01M 6/26 |
| | | | | 204/265 |
| 2004/0131906 A1 | * | 7/2004 | Ovshinsky | C01B 13/02 |
| | | | | 429/223 |
| 2005/0126924 A1 | | 6/2005 | Gomez | |
| 2012/0121998 A1 | | 5/2012 | Bienvenu | |
| 2015/0027878 A1 | * | 1/2015 | Funakawa | C25B 1/46 |
| | | | | 204/252 |

* cited by examiner

U = 1.35+0.05 (OP) $V_{RHE}$ $V = \Delta U = 1.4-(-0.05) = 1.45V$

U = 0-0.05 (OP) $V_{RHE}$

V=0

METHODS AND SYSTEM FOR HYDROGEN PRODUCTION BY WATER ELECTROLYSIS

RELATED APPLICATIONS

This application is a National Phase of PCT Patent Application No. PCT/IL2015/051120 having International filing date of Nov. 19, 2015, which claims the benefit of priority under 35 USC § 119(e) of U.S. Provisional Patent Application No. 62/081,671 filed on Nov. 19, 2014. The contents of the above applications are all incorporated by reference as if fully set forth herein in their entirety.

FIELD AND BACKGROUND OF THE INVENTION

The present invention, in some embodiments thereof, relates to hydrogen production and, more particularly, but not exclusively, to novel systems and methods for performing hydrogen production by water electrolysis.

The issue of renewable energy has become the focus of many researches over the past few decades. Energy demand is increasing, and is projected to increase even faster, driven by strong economic growth and expanding populations. This energy is largely supplied by fossil fuels (82% according to the EIA data). This presents several challenges, mainly the resulting pollution and depletion of natural resources.

These challenges bring about the need for energy systems which are based on renewable resources. Specifically, many efforts have been focused on solutions for electricity generation and incorporation of such systems into the electrical grid. A prominent example of such a system is photovoltaic electricity production.

However, an electric system based on renewable energy faces the issue of intermittency, with the main challenge being the mismatch between the time periods of energy production and energy demand. This mismatch poses a threat to grid stability and creates a barrier for the incorporation of renewable energy into the grid. In the case of photovoltaic electricity, solar energy is only provided during daytime and may further be disturbed by undesirable weather conditions.

A promising pathway for overcoming this obstacle is the conversion of renewable energy into synthetic fuel. In this respect, one of the main candidates being investigated as a renewable fuel is molecular hydrogen ($H_2$). While molecular hydrogen is scarcely found in nature, it is stored in vast amounts in water molecules, and it can be released from water by electrolysis [1] [2] [6] [7]. See, for example, Krol, R. and Grázel, M. (2012). Photoelectrochemical hydrogen production. 1st ed. New York: Springer.; Bak et al. (2002) International journal of hydrogen energy, 27(10), pp. 991-1022; Pinaud et al., (2013) Energy & Environmental Science, 6(7), pp. 1983-2002; Ursua et al. (2012) Proceedings of the IEEE, 100(2), pp. 410-426.

Electrolysis is the process wherein electric current passes through an electrolyte resulting in chemical reactions that decompose the electrolyte. In water electrolysis, an external power source is connected to two electrodes which are immersed in an aqueous electrolyte. The electrodes are typically made from an inert metal and the reactions taking place are oxidation and reduction of aqueous species within the electrolyte. Electric current causes ions to migrate to the oppositely charged electrode where either a reduction or oxidation reaction takes place. In widely used alkaline water electrolysis, the electrolyte is an alkaline solution, usually a concentrated solution of KOH or NaOH. The hydroxide ions ($OH^-$) migrate to the anode where the oxidation evolution reaction (OER) takes place and oxygen gas ($O_2$) is evolved. Hydrogen gas ($H_2$) is evolved at the cathode where water reduction, or hydrogen evolution reaction (HER) takes place. The overall reaction is:

$$H_2O \rightarrow H_2(g) + \tfrac{1}{2}O_2(g).$$

$RuO_2$ and $IrO_2$ are currently considered optimal materials for OER because they exhibit the lowest overpotentials. However, because the $RuO_2$ and $IrO_2$ are expensive and have poor long-term stability in alkaline solution, oxyhydroxide films of nickel and its alloys are more frequently used for OER anodes [Lyons et al., *Int J Electrochem Sci* 2012, 7:2710-1763].

Another component of most water electrolysis systems is the membrane which is necessary to prevent the mixing of product gases with one another for the sake of efficiency and safety. While the membrane separates the reaction products, oxygen and hydrogen, it allows the transfer of ions, thereby facilitating ionic current between the anode and cathode.

Currently practiced technologies which employ the use of a membrane for alkaline water electrolysis are typically based on the concept of a single cell within which both reactions take place, wherein the cathode and anode compartments are separated by a membrane. This configuration, however, is incompatible when, for example, substances such as photo-electrodes are introduced into the system.

Within the last four decades, photoelectrodes have been studied extensively and they are considered promising for sustainable hydrogen production systems, in technologies for water electrolysis that employ photoelectrochemical (PEC) cells.

A PEC cell consists of a semiconductor photo-anode and metal cathode and/or a semiconductor photo-cathode and metal anode. When the semiconductor photo-electrode is illuminated with light having energy greater than its bandgap, an electron is excited from the valence band to the conduction band, creating an electron-hole pair.

In the case of alkaline water electrolysis using a metal cathode and a semiconductor photo-anode, holes accumulate at the photo-anode/electrolyte interface where the oxygen formation takes place. The electrons are transported via the connecting wire to the metal cathode where hydrogen formation takes place. Hydroxide ions migrate through the electrolyte in the opposite direction, namely, from the cathode to the anode, thereby closing the current loop wherein electrons travel in the external circuit (through an electric wire that connects the anode to the cathode) and ions travel through the electrolyte.

The PEC water splitting into $H_2$ and $O_2$ entails the development and exploration of semiconducting materials which are chemically stable and have significant optical absorption cross section. Since the discovery of water photolysis on $TiO_2$ electrodes by Fujishima and Honda, semiconducting metal oxides have remained under focus [see, for example, Sivula et al. (2011). ChemSusChem, 4(4), pp. 432-449]. Among the various oxides, hematite ($\alpha$-$Fe_2O_3$), a stable, non-toxic, and abundant material which is photoactive under visible light, has been the subject of much interest [see, for example, U.S. Pat. No. 6,228,535].

One issue which arises from the use of a photo-electrode is the large area needed in order to collect sunlight since the photocurrent density at the photo-electrode is much smaller than the current density at the counter metal electrode.

Therefore, the size of the photo-electrode compartment must be much larger than that of the counter metal electrode. This leads to a major difficulty in the aforementioned single-cell configuration because of the need to seal the entire assembly. A solar PEC hydrogen production plant requires the entire array to be totally sealed in order to collect the hydrogen gas. This is a very difficult technical challenge given the huge area of the PEC solar collectors, and moreover the nature of the produced $H_2$ which is unsafe, difficult to encase, and requires special materials to contain it.

The production, storage and transportation of hydrogen gas pose additional obstacles. Hydrogen gas is highly diffusive; it has an extremely low density and a broad flammability range. Hydrogen production in the same cell where oxygen is produced presents a safety problem in addition to the possible decrease in system efficiency. These characteristics of hydrogen gas lead to essential difficulties at every step from distribution through storage to end-usage. As a partial solution, hydrogen can be stored and transported using carbon or nitrogen carriers which are safer and easier to handle than hydrogen. In any event, in a configuration where hydrogen and oxygen are produced in a single cell on the solar array site, hydrogen needs to be transported from this site to a distribution network or to a fuel production site.

Additional background art includes International Patent Application PCT/US2006/014122 (published as WO 2006/113463) and U.S. Patent Application Publication No. 2012/0121998.

SUMMARY OF THE INVENTION

According to an aspect of some embodiments of the present invention there is provided a system for generating hydrogen gas from an aqueous solution, the system comprising: a first compartment comprising a first working electrode and a first redox-active electrode; and a second compartment comprising a second working electrode and a second redox-active electrode, each of the first compartment and the second compartment having an inlet configured for receiving an aqueous solution, the first working electrode being connectable to a power source and being configured to effect reduction of water in the aqueous solution in response to voltage applied by the power source, to thereby generate hydrogen gas and hydroxide ions, the second working electrode being connectable to the power source and being configured to effect oxidation of hydroxide ions in response to voltage applied by the power source, to thereby generate oxygen gas and water, and the second redox-active electrode and the first redox-active electrode being electrically connectable to one another, and each being capable of reversibly undergoing oxidation in the presence of hydroxide ions and undergoing reduction in the presence of water to thereby produce hydroxide ions, the first and second compartments being separated from each other.

According to some of any of the embodiments of the invention, the first and second compartments are spaced apart from each other.

According to some of any of the embodiments of the invention, the oxidation of the second redox-active electrode and the first redox-active electrode is characterized by a standard redox potential in a range of from 0 to 1.6 $V_{RHE}$.

According to some of any of the embodiments of the invention, the first redox-active electrode comprises $Ni(OH)_2$ capable of reversibly undergoing oxidation to a nickel oxyhydroxide.

According to some of any of the embodiments of the invention, the first redox-active electrode is characterized by an oxygen evolution reaction kinetic potential which is at least 0.1 V higher than the standard redox potential.

According to some of any of the embodiments of the invention, the first redox-active electrode is capable of reversibly undergoing the oxidation in response to a first voltage, and undergoing the reduction in response to a second voltage having an opposite polarity with respect to the first voltage.

According to some of any of the embodiments of the invention, the first redox-active electrode and the second redox-active electrode are configured to be removable from the compartments and to be interchangeable.

According to some of any of the embodiments of the invention, the first compartment has a first gas outlet.

According to some of any of the embodiments of the invention, the second compartment has a second gas outlet.

According to some of any of the embodiments of the invention, the system is configured such that a gas evacuated from the first compartment is isolated from a gas evacuated from the second compartment.

According to some of any of the embodiments of the invention, the system further comprises a reservoir configured for receiving hydrogen gas.

According to an aspect of some embodiments of the present invention there is provided a method for generating hydrogen gas from an aqueous solution, the method comprising applying a first voltage between a first working electrode and a second working electrode of a system comprising: a first compartment comprising the first working electrode and a first redox-active electrode, the first compartment having therein an aqueous solution; and a second compartment comprising the second working electrode and a second redox-active electrode, the second compartment having therein an aqueous solution, the second redox-active electrode and the first redox-active electrode being electrically connected to one another, and each being capable of reversibly undergoing oxidation in the presence of hydroxide ions and undergoing reduction in the presence of water to thereby produce hydroxide ions, the first compartment and the second compartment being separated from each other, wherein the first voltage is sufficient to concomitantly effect: reduction of water in the aqueous solution at the first working electrode, to thereby generate hydrogen gas and hydroxide ions; oxidation of hydroxide ions at the second working electrode, to thereby generate oxygen gas and water; the oxidation in the presence of hydroxide ions of the first redox-active electrode; and the reduction in the presence of water of the second redox-active electrode.

According to some of any of the embodiments of the invention, the oxidation of the second redox-active electrode and the first redox-active electrode is characterized by a standard redox potential in a range of from 0 to 1.6 $V_{RHE}$.

According to some of any of the embodiments of the invention, the first voltage is at least 1.5 V.

According to some of any of the embodiments of the invention, the method further comprises collecting the generated hydrogen gas.

According to some of any of the embodiments of the invention, the method further comprises applying a second voltage, subsequently to the first voltage, between the first working electrode and the second working electrode of the system, the second voltage having an opposite polarity with respect to the first voltage, and being sufficient to concomitantly effect the oxidation of the second redox-active electrode in the presence of hydroxide ions and the reduction of the first redox-active electrode in the presence of water.

According to some of any of the embodiments of the invention, the second voltage is sufficient to concomitantly effect reduction of water in the aqueous solution to thereby generate hydrogen gas and hydroxide ions at the second working electrode, and oxidation of hydroxide ions to thereby generate oxygen gas and water at the first working electrode.

According to some of any of the embodiments of the invention, the method further comprises collecting the generated oxygen gas.

According to some of any of the embodiments of the invention, the second voltage is at least 1.5 V.

According to some of any of the embodiments of the invention, the method further comprises repeating the applying the first voltage and subsequently applying the second voltage.

According to some of any of the embodiments of the invention, the method further comprises, subsequently to applying the first voltage, replacing the first redox-active electrode with the second redox-active electrode and replacing the second redox-active electrode with the first redox-active electrode, and applying the first voltage.

According to some of any of the embodiments of the invention, the method further comprises repeating the replacing the first redox-active electrode with the second redox-active electrode, the replacing the second redox-active electrode with the first redox-active electrode, and applying the first voltage.

According to an aspect of some embodiments of the present invention there is provided a system for generating hydrogen gas from an aqueous solution, the system comprising: a compartment comprising a working electrode and a redox-active electrode; the compartment having an inlet configured for receiving an aqueous solution, and at least one gas outlet configured for controllably evacuating a gas from the compartment, the working electrode being connectable to a power source and being configured to effect reduction of water in the aqueous solution in response to voltage applied by the power source, to thereby generate hydrogen gas and hydroxide ions, and the redox-active electrode being capable of reversibly undergoing oxidation in the presence of hydroxide ions and undergoing reduction in the presence of water, wherein the oxidation is characterized by a standard redox potential in a range of from 0 to 1.6 $V_{RHE}$.

According to some of any of the embodiments of the invention, the first redox-active electrode comprises $Ni(OH)_2$ capable of reversibly undergoing oxidation to a nickel oxyhydroxide.

According to some of any of the embodiments of the invention, the first redox-active electrode is capable of reversibly undergoing the oxidation in response to a first voltage, and undergoing the reduction in response to a second voltage having an opposite polarity with respect to the first voltage.

According to some of any of the embodiments of the invention, the redox-active electrode is characterized by an oxygen evolution reaction kinetic potential which is at least 0.1 V higher than the standard redox potential.

According to some of any of the embodiments of the invention, the oxidation is characterized by a standard redox potential in a range of from 1.23 to 1.5 $V_{RHE}$.

According to some of any of the embodiments of the invention, the reduction is effected by production of molecular oxygen.

According to some of any of the embodiments of the invention, a rate of production of molecular oxygen is increased by a rise in temperature of the redox-active electrode.

According to some of any of the embodiments of the invention, the system further comprises a heat source configured for producing the rise in temperature of the redox-active electrode.

According to some of any of the embodiments of the invention, the rise in temperature of the redox-active electrode is effected by heating an aqueous solution in the system.

According to some of any of the embodiments of the invention, the at least one gas outlet comprises a first gas outlet and a second gas outlet, each of the first and second gas outlets being configured for controllably evacuating a gas from the compartment, wherein a gas evacuated via the first gas outlet is isolated from a gas evacuated via the second gas outlet.

According to some of any of the embodiments of the invention, the system further comprises a reservoir configured for receiving hydrogen gas from the first gas outlet.

According to some of any of the embodiments of the invention, the system further comprises a reservoir configured for receiving oxygen gas from the second gas outlet.

According to some of any of the embodiments of the invention, the first compartment is configured for alternating between a hydrogen-generation mode and an oxygen-generation mode, wherein: the hydrogen-generation mode is characterized by the first gas outlet being configured for evacuating hydrogen gas from the compartment and the second gas outlet being closed, and the oxygen-generation mode is characterized by the second gas outlet being configured for evacuating oxygen gas from the compartment, and the first gas outlet being closed.

According to some of any of the embodiments of the invention, the compartment is non-partitioned.

According to an aspect of some embodiments of the present invention there is provided a method for generating hydrogen gas from an aqueous solution, the method comprising applying a first voltage between a working electrode and a redox-active electrode of a system comprising a compartment having therein an aqueous solution, the working electrode and the redox-active electrode; the redox-active electrode being capable of reversibly undergoing oxidation in the presence of hydroxide ions and undergoing reduction in the presence of water, wherein each of the oxidation and the reduction is characterized by a standard redox potential in a range of from 0 to 1.6 $V_{RHE}$, wherein the first voltage is sufficient to concomitantly effect: reduction of water in the aqueous solution at the working electrode, to thereby generate hydrogen gas and hydroxide ions; and the oxidation in the presence of hydroxide ions of the redox-active electrode.

According to some of any of the embodiments of the invention, the first voltage is in a range of from 0.05 to 1.6 V.

According to some of any of the embodiments of the invention, the method further comprises collecting the generated hydrogen gas.

According to some of any of the embodiments of the invention, the method further comprises stimulating the redox-active electrode to effect reduction of the redox-active electrode, to thereby generate oxygen gas, subsequently to the applying a first voltage.

According to some of any of the embodiments of the invention, the stimulating comprises heating.

According to some of any of the embodiments of the invention, the stimulating comprises heating an aqueous solution.

According to some of any of the embodiments of the invention, the first voltage is in a range of from 1.23 to 1.5 V.

According to some of any of the embodiments of the invention, the stimulating comprises applying a second voltage to the system, the second voltage having an opposite polarity with respect to the first voltage.

According to some of any of the embodiments of the invention, the second voltage is sufficient to concomitantly effect oxidation of hydroxide ions to thereby generate oxygen gas and water, and the reduction of the redox-active electrode.

According to some of any of the embodiments of the invention, a sum of the first voltage and the second voltage is at least 1.6 V.

According to some of any of the embodiments of the invention, the method further comprises repeating the applying the first voltage, and the stimulating the redox-active electrode to thereby generate oxygen gas.

According to some of any of the embodiments of the invention, the aqueous solution comprises an electrolyte.

According to some of any of the embodiments of the invention, the electrolyte comprises a metal hydroxide.

According to some of any of the embodiments of the invention, a concentration of hydroxide ions in the aqueous solution is at least 0.01 M.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 9A-C present schematic illustrations of a 2-cell system according to some embodiments of the present invention, with Pt electrodes as the HER and OER electrodes and Ni(OH)$_2$/NiOOH accessory electrodes (electrodes A and B) connecting the cells, wherein FIG. 9A presents a first step of the electrolysis, in which current is applied in a counter-clockwise direction, FIG. 9B presents a second step of the electrolysis according to some embodiments, in which current direction is reversed relative to the first step, and FIG. 9C presents a second step of the electrolysis according to alternative embodiments, in which the current direction is the same as in FIG. 9A and positions of electrodes A and B are replaced.

FIG. 17B is a close-up of cell (2) containing a Pt CE and a Ni(OH)$_2$/NiOOH accessory electrode, and FIG. 17C is a close-up of cell (1) containing a hematite photo-anode (WE) facing a clear window through which light can be transmitted for photo-electrochemical experiments, and a Ni(OH)$_2$/NiOOH accessory electrode.

DESCRIPTION OF SPECIFIC EMBODIMENTS OF THE INVENTION

Figure 1:
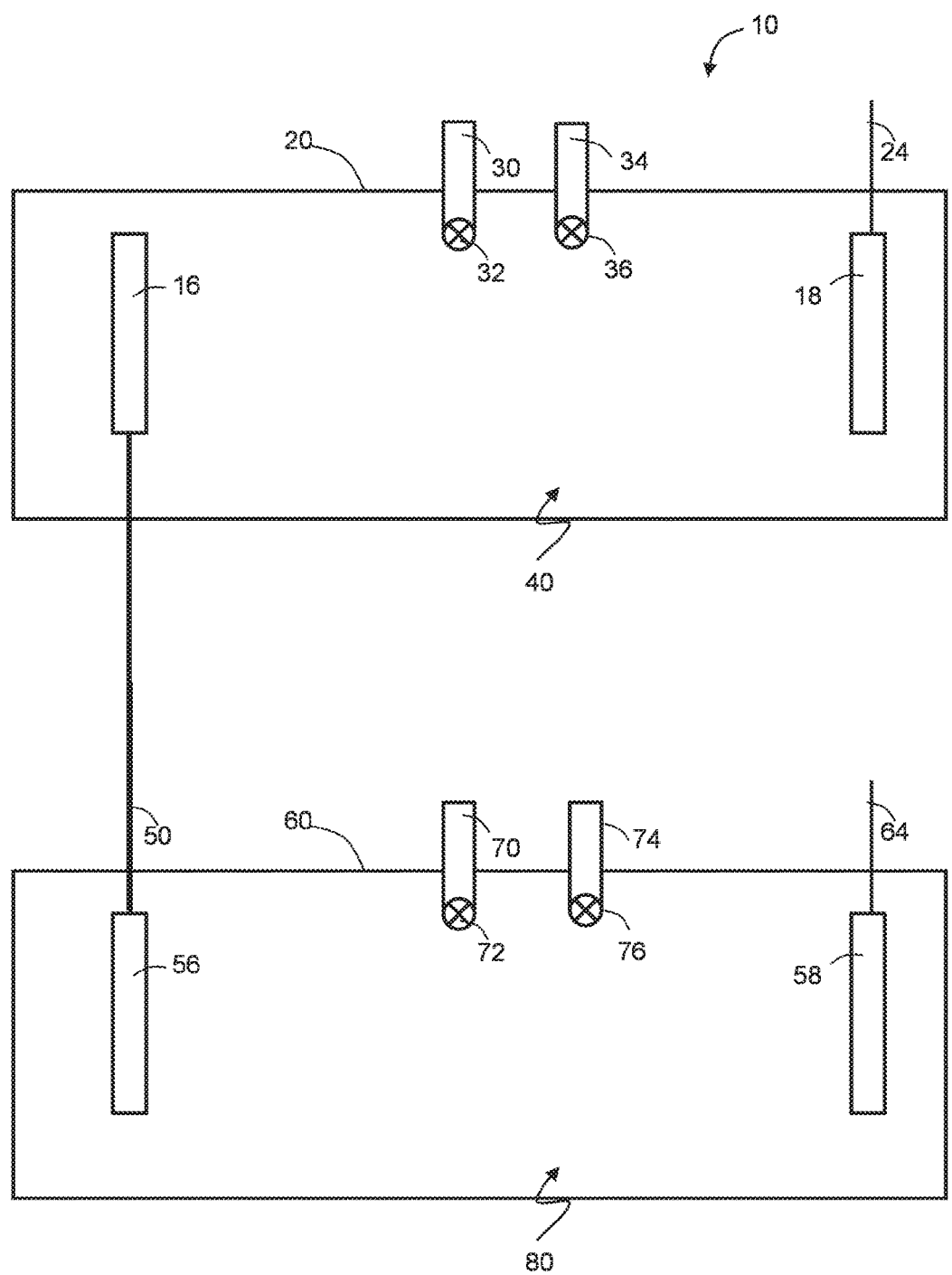
FIG. 1 presents a scheme showing a system for producing hydrogen according to some embodiments of the invention, wherein hydrogen and oxygen are generated in separate compartments.

The present invention, in some embodiments thereof, relates to hydrogen production and, more particularly, but not exclusively, to a novel system and method for performing hydrogen production by water electrolysis.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present inventors have envisioned that the efficiency and cost-effectiveness of hydrogen gas production by water electrolysis (e.g., alkaline water electrolysis) may be enhanced by separating the hydrogen evolution reaction (HER) and oxygen evolution reaction (OER) in time and/or space by using electrodes which undergo reversible oxidation and reduction. Separation of the HER and OER reduces contamination of the obtained gas, reduces and even nullifies a hazardous contact between the obtained hydrogen and oxygen gases, and avoids the use of expensive and/or readily degradable membranes to separate the gases.

While reducing the present invention to practice, the present inventors have devised a system in which the HER and OER are effected at working electrodes in separate compartments which are electrically connected (indirectly) via accessory electrodes which undergo reversible oxidation and reduction, as well as a single-compartment system in which the HER and OER are effected at different times.

Water Electrolysis:

Electrolysis of water, by reduction of water to thereby generate hydrogen gas and hydroxide ions (referred to herein and in the art as a "hydrogen evolution reaction" or "HER"), and oxidation of hydroxide ions to thereby generate oxygen gas and water (referred to herein and in the art as an "oxygen evolution reaction" or "OER"). These reactions may be represented, respectively, by the following formulas:

$2H_2O + 2e^- \rightarrow H_2 + 2OH^-$ (cathodic reaction)

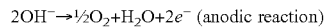

$2OH^- \rightarrow \frac{1}{2}O_2 + H_2O + 2e^-$ (anodic reaction)

In any of the embodiments herein (according to any of the aspects of the embodiments described herein), electrolysis of water may be effected by reducing water at a working electrode to thereby generate hydrogen gas and hydroxide ions and by oxidizing hydroxide ions at a working electrode to thereby generate oxygen gas and water. As discussed in detail herein, the HER may be effected at a different working electrode than the OER, and/or the HER and OER may be effected at the same working electrode at different times.

In any of the embodiments described herein, a working electrode for effecting a hydrogen evolution reaction (e.g., according to any of the respective embodiments described herein) may be composed of any material suitable for a cathode at which a hydrogen evolution reaction occurs, for example, under alkaline conditions (e.g., according to any of the embodiments described herein relating to an alkaline aqueous solution).

In some embodiments of any of the embodiments described herein, a working electrode is composed of any material suitable both for a cathode at which a hydrogen evolution reaction occurs and for an anode at which an oxygen evolution reaction occurs (e.g., under alkaline conditions). Such a working electrode may be used, for example, in embodiments wherein a hydrogen evolution reaction and an oxygen evolution reaction occur at a working electrode at different times.

In some embodiments of any of the embodiments described herein, a working electrode for effecting a hydrogen evolution reaction comprises carbon, one or more photoactive material (e.g., photocathode material), and/or one or more metals. Suitable metals include, for example, platinum, nickel and stainless steel. Two or more metals may optionally be included as any combination thereof, for example as an alloy and/or as a metal plated by another metal (e.g., nickel-plated stainless steel, platinum-plated stainless steel).

Herein, the term "photoactive material" encompasses photocathode materials and photoanode materials, as these terms are defined herein.

Herein, the term "photocathode material" refers to a material which emits an electron upon absorption of light (e.g., visible light).

Examples of suitable photocathode materials include, without limitation, semiconductors such as silicon and $Cu_2O$ (e.g., in p-type form), Ag—O—Cs, Sb—Cs, bialkali (e.g., Sb—Rb—Cs, Sb—K—Cs, and/or Na—K—Sb), multialkali (e.g., Na—K—Sb—Cs), gallium(II) arsenide, and indium gallium arsenide.

Herein, the term "photoanode material" refers to a material which accepts an electron upon absorption of light (e.g., visible light).

In some embodiments of any of the embodiments described herein, a working electrode for effecting a hydrogen evolution reaction comprises at least one additional substance which acts as a catalyst of a cathodic reaction, such as reduction of water to thereby generate molecular hydrogen. Examples of such substances include, for example, nickel boride and platinum. Such a catalyst may optionally decrease an overpotential associated with the cathodic reaction, thereby reducing a minimal value for a first voltage needed to produce hydrogen gas.

In any of the embodiments described herein, a working electrode for effecting an oxygen evolution reaction (e.g., according to any of the respective embodiments described herein) may be composed of any material suitable for an anode at which an oxygen evolution reaction occurs, for example, under alkaline conditions (e.g., according to any of the embodiments described herein relating to an alkaline aqueous solution).

In some embodiments of any of the embodiments described herein, a working electrode for effecting an oxygen evolution reaction comprises carbon, one or more photoactive material (e.g., photoanode material), and/or one or more metals. Suitable metals include, for example, platinum, nickel and stainless steel. Two or more metals may optionally be included as any combination thereof, for example as an alloy and/or as a metal plated by another metal (e.g., nickel-plated stainless steel, platinum-plated stainless steel).

Examples of suitable photoanode materials include, without limitation, semiconductors (e.g., silicon and $Cu_2O$) in n-type form, $TiO_2$, $Fe_2O_3$ (e.g., hematite ($\alpha$-$Fe_2O_3$)), $WO_3$ and $BiVO_4$. Hematite is an exemplary photoanode material.

In some embodiments of any of the embodiments described herein, a working electrode for effecting an oxygen evolution reaction comprises at least one additional substance which acts as a catalyst of an anodic reaction, such as oxidation of hydroxide ion to thereby generate molecular oxygen. Examples of such substances include, for example, $RuO_2$, $IrO_2$, $Fe_2O_4$, $Co_3O_4$, $CoO_x$ wherein $0<x<2$, $Ni(OH)_2$, a nickel oxyhydroxide, $Ni_{1-x}Fe_x(OH)_2$ wherein $0<x<1$, $Ni_{1-x}Fe_xOOH$ wherein $0<x<1$, cobalt phosphate and nickel borate. Such a catalyst may optionally decrease an overpotential associated with the anodic reaction, thereby reducing a minimal value for a first voltage needed to produce molecular oxygen (e.g., oxygen gas).

Each electrode described herein (e.g., a working electrode described herein) may optionally comprise one or more active materials of the electrode (e.g., active materials described hereinabove) coated on a substrate, for example, an electrically conductive substrate, or comprise the active material(s) per se.

Each electrode described herein (including a working electrode and/or redox-active electrode according to any of the embodiments described herein) independently may optionally comprise of a single unit or several units which are connected to a current collector.

In some embodiments of any of the embodiments described herein, an aqueous solution according to any of the aspects described herein (e.g., an aqueous solution in any of the electrochemical cells in any of the systems described herein) comprises an electrolyte.

The aqueous solution may be any aqueous solution suitable for use in electrolysis, e.g., electrolysis of water.

In some embodiments of any of the embodiments described herein, the electrolyte comprises a metal which is Li, Na, K, Rb, Cs, Ca, Sr or Ba, for example as a salt of the metal. In some embodiments, the metal is an alkali metal.

In some embodiments of any of the embodiments described herein, the electrolyte comprises a metal hydroxide. In some embodiments, the metal hydroxide comprises a hydroxide of Li, Na, K, Rb, Cs, Ca, Sr or Ba. In some embodiments, the metal hydroxide comprises a hydroxide of an alkali metal. In some embodiments, the metal hydroxide is NaOH or KOH.

In some embodiments of any of the embodiments described herein, an aqueous solution according to any of the respective embodiments described herein is alkaline, being characterized by a pH above 7, optionally at least 8, optionally at least 9, optionally at least 10, optionally at least 11, optionally at least 12, optionally at least 13, and optionally at least 14.

In some embodiments of any of the embodiments described herein, a concentration of hydroxide ion in an aqueous solution according to any of the respective embodiments described herein is at least 0.01 M. In some embodiments, the concentration of hydroxide ion is at least 0.03 M. In some embodiments, the concentration of hydroxide ion is at least 0.1 M. In some embodiments, the concentration of hydroxide ion is at least 0.3 M. In some embodiments, the concentration of hydroxide ion is at least 1 M. In exemplary embodiments, the concentration of hydroxide ion is about 1 M.

In some embodiments of any of the embodiments described herein, a concentration of alkali metal hydroxide (e.g., NaOH and/or KOH) in an aqueous solution according to any of the respective embodiments described herein is at least 0.01 M. In some embodiments, the concentration of alkali metal hydroxide (e.g., NaOH and/or KOH) is at least 0.03 M. In some embodiments, the concentration of alkali metal hydroxide (e.g., NaOH and/or KOH) is at least 0.1 M. In some embodiments, the concentration of alkali metal hydroxide (e.g., NaOH and/or KOH) is at least 0.3 M. In some embodiments, the concentration of alkali metal hydroxide (e.g., NaOH and/or KOH) is at least 1 M. In exemplary embodiments, the concentration of alkali metal hydroxide is about 1 M.

The upper limit of a hydroxide ion and/or metal hydroxide concentration may be determined, for example, by a solubility limit of a hydroxide salt in the solution under operating conditions (e.g., at a temperature of about 25° C.).

Herein, a "concentration of hydroxide ion" refers to an average concentration throughout a solution. The skilled person will appreciate that a concentration of hydroxide ion near an anode may differ substantially from a concentration of hydroxide ion near a cathode.

In some embodiments of any of the embodiments described herein, a concentration of NaOH in an aqueous solution according to any of the respective embodiments described herein is in a range of from 0.5 to 52.6 weight percents.

In some embodiments of any of the embodiments described herein, a concentration of KOH in an aqueous solution according to any of the respective embodiments described herein is in a range of from 0.5 to 54.8 weight percents.

A concentration of an electrolyte (e.g., hydroxide ion) in an aqueous solution according to any of the respective embodiments described herein may optionally remain constant (e.g., during production of hydrogen gas) or be changed (e.g., during production of hydrogen gas).

Hydrogen and Oxygen Evolution in Separate Compartments:

Referring now to the drawings, FIG. 1 generally illustrates a system 10 for producing hydrogen according to an aspect of some embodiments of the invention.

In the representative example illustrated in FIG. 1, system 10 is composed of a first container 20 and a second container 60. Containers 20 and 60 are preferably separated from one another (e.g., such that a fluid cannot pass from one to the other), and may optionally be adjacent to each other or spaced apart, for example, by a distance of at least 1 meter, at least 10 meters, at least 100 meters, and even at least 1 km.

Container 20 comprises a first working electrode 18 and a first redox-active electrode 16 and, when the system is operated, an aqueous solution 40, preferably an aqueous electrolyte solution, at least partially fills container 20. Working electrode 18 or part thereof (e.g., the lower part) and redox-active electrode 16 or part thereof (e.g., the lower part) is kept in contact with aqueous solution 40 during operation of the system. Container 20 and electrodes 16 and 18 are together (with or without aqueous solution 40) collectively referred to herein and as a "first electrochemical cell".

Similarly, container 60 comprises a second working electrode 58 and a second redox-active electrode 56 and, when the system is operated, an aqueous solution 80, preferably an aqueous electrolyte solution, at least partially fills container 60. Working electrode 58 or part thereof (e.g., the lower part) and redox-active electrode 56 or part thereof (e.g., the lower part) is kept in contact with aqueous solution 80 during operation of the system. Container 60 and electrodes 56 and 58 are together (with or without aqueous solution 80) collectively referred to herein and as a "second electrochemical cell".

Herein, the term "electrochemical cell" is used for the sake of brevity and readability to refer to a compartment comprising at least two electrodes (with or without an aqueous (electrolyte) solution), according to any of the respective embodiments described herein, and is not intended to imply any limitations beyond those explicitly described herein. This term is referred to herein interchangeably as a compartment comprising at least two electrodes (e.g., a working electrode and at least one additional electrode), as described herein.

Similarly, an electrochemical cell (e.g., first or second electrochemical cell) comprising a container (e.g., first or second container) and electrodes (e.g., a working electrode and at least one additional electrode) in the container is herein to be interpreted as being interchangeable with a compartment comprising the electrodes (e.g., a working electrode and at least one additional electrode).

Herein throughout, the term "redox-active" refers to a substance or material capable of undergoing oxidation and/or reduction, preferably in a reversible manner (e.g., according to any of the respective embodiments described herein), and encompasses the substance or material in an oxidized state thereof, a reduced state thereof, and any intermediate (e.g., partially oxidized) state.

Herein, the phrase "redox-active electrode" and "accessory electrode" are used interchangeably, in particular with respect to embodiments described herein relating to a pair of cells (e.g., wherein the redox-active electrodes are electrically connectable and/or connected to one another).

In some embodiments, container 20 and/or 60 is non-partitioned, that is, the container(s) is devoid of a partition (e.g., an ion exchange membrane) between electrode 18 and electrode 16 (or between electrode 58 and electrode 56), which prevents flow of a gas from one electrode to the other. However, embodiments wherein container 20 and/or 60 is partitioned (optionally by an ion exchange membrane) are also contemplated herein.

In some such embodiments, system 10 is devoid of any ion exchange membrane. Absence of a membrane may optionally reduce a cost and/or enhance a durability of the system, and/or allow operation of the system at higher gas pressures.

First redox-active electrode 16 and second redox-active electrode 56 are electrically connectable to each other, and in some optional embodiments, are connected to each other by electrical connection 50, which is optionally a metal wire.

First redox-active electrode 16 and second redox-active electrode 56 are each capable of reversibly undergoing oxidation in the presence of hydroxide ions and undergoing reduction in the presence of water (the reduction optionally producing hydroxide ions), according to any of the embodiments described herein relating to redox-active electrodes, and optionally according to any of the embodiments described in this section (relating to hydrogen and oxygen evolution in separate compartments). In some embodiments, redox-active electrode 16 and/or redox-active electrode 56 comprise $Ni(OH)_2$ and/or a nickel oxyhydroxide, at least a portion of which is typically found on the surface of electrode 16 and/or 56, preferably at a part which is in contact with solution 40 or 80, respectively.

By "reversibly undergoing" oxidation and/or reduction, it is meant herein throughout that a product (e.g., in an electrode) obtained upon the indicated oxidation and subsequent reduction of an initial substance (e.g., in an electrode) is essentially the same as the initial substance. The oxidation and reduction reactions may optionally be mirror images of one another. Alternatively, the oxidation and reduction reactions are not mirror images of one another, for example, wherein an additional reaction (e.g., a spontaneous and/or non-redox reaction) must occur upon oxidation or reduction to complete a reversible cycle of oxidation and reduction.

In some embodiments, first redox-active electrode 16 and second redox-active electrode 56 are configured to be removable from their respective containers (as depicted in FIG. 1) and to be interchangeable, such that redox-active electrode 16 can replace redox-active electrode 56 in container 60, and/or redox-active electrode 56 can replace redox-active electrode 16 in container 20. In some such embodiments, hydrogen gas may be produced continuously or almost continuously by system 10 at redox-active electrode 16, by replacing redox-active electrode 16 with redox-active electrode 56 (and vice versa) when one or both electrodes 16 and 18 begin to be depleted of redox-active material needed to continue operation of system 10 at a given voltage.

Solutions 40 and 80 may be the same or different. Solution 40 and/or 80, according to some embodiments of the invention, comprises a metal hydroxide electrolyte as discussed herein, such as, for example, a metal alkali hydroxide, dissolved or suspended in an aqueous solution.

In some embodiments, electrodes 18 and 58 are connectable to a power source, such as a DC power source. The power source may optionally be a battery, a capacitor, a power generation device (e.g., of a power plant), a photovoltaic (PV) power source or any combination thereof.

As used herein, the phrase "connectable to a power source" encompasses being configured so as to allow a connection to a power source, being connected to a power source, as well as comprising a power source. For example, electrode 18 and/or 58 may optionally comprise a photocathode and/or photoanode (according to any of the respective embodiments described herein) which serve as a power source, wherein electrodes 18 and 58 are connectable to each other.

In various exemplary embodiments of the invention, system 10 further comprises electrical leads 24 and/or 64 for connecting electrodes 18 and/or 58 to an electric power source, so as to generate an electric potential difference between electrodes 18 and 58. Upon such connection, electrons begin to flow from electrode 58 to electrode 18 (and from electrode 16 to electrode 56) or vice versa, depending on the polarity of the electric potential difference. The electrical current flowing in the thus closed electrical circuit can be measured and optionally monitored using a current measuring device connectable (optionally connected) in serial to the electric power source (not shown). Other parameters, such as voltage, can also be measured, if desired, as known in the art.

In some embodiments, the system further comprises a reference electrode (not shown), in any one or more of the containers, e.g., as exemplified herein. The reference electrode is optionally configured for monitoring, e.g., voltage.

In various exemplary embodiments of the invention, when electrons flow from electrode 58 to electrode 18, negatively charged hydroxide ions in solution 40 flow towards electrode 16 and away from electrode 18, and react so as to oxidize redox-active electrode 16, and negatively charged hydroxide ions in solution 80 flow towards electrode 58 and away from electrode 56, and are oxidized at working electrode 58 so as to generate oxygen gas. In addition, the vicinity of working electrode 18 and the vicinity of redox-active electrode 56 consequently become more acidic, thereby facilitating reduction of hydrogen ions in water at working electrode 18 so as to generate hydrogen gas, and reduction of redox-active electrode 56 (e.g., so as to generate hydroxide ions).

Alternatively or additionally, when electrons flow from electrode 18 to electrode 58, negatively charged hydroxide ions in solution 40 flow towards electrode 18 and away from electrode 16, and are oxidized at electrode 18 so as to generate oxygen gas, and negatively charged hydroxide ions in solution 80 flow towards electrode 56 and away from electrode 58, and react so as to oxidize redox-active electrode 56. In addition, the vicinity of working electrode 58 the vicinity of redox-active electrode 16 consequently become more acidic, thereby facilitating reduction of hydrogen ions in water at working electrode 58 so as to generate hydrogen gas, and reduction of redox-active electrode 16 (e.g., so as to generate hydroxide ions).

In some embodiments of the invention, system 10 further comprises at least one gas outlet 30, for allowing evacuation of hydrogen gas and/or oxygen gas out of container 20, and/or at least one gas outlet 70, for allowing evacuation of hydrogen gas and/or oxygen gas out of container 60. In some embodiments (e.g., embodiments wherein hydrogen gas is generated solely in container 20 and oxygen gas is generated solely in container 60), the outlets are configured such that a gas evacuated via gas outlet 30 is isolated from a gas evacuated via outlet 70.

Evacuation of a gas through gas outlet 30 and/or 70 is optionally controlled, for example, by optional valve 32 or 72, respectively, which when closed prevents release of gas through gas outlet 30 or 70, respectively, and isolates previously evacuated gas from container 20 and/or 60. The evacuated hydrogen gas and/or oxygen gas can optionally be collected in a reservoir (not shown) configured for collecting the gas. Preferably, evacuated hydrogen gas is collected in a reservoir (not shown) configured for collecting hydrogen gas, optionally hydrogen gas from outlet 30. Thus, in some embodiments of the present invention a gas (e.g., hydrogen gas) is conveyed, e.g., by means of a gas conveying tube (not shown), to the reservoir or any other external location.

In some embodiments, evacuated oxygen gas is collected in a reservoir (not shown) configured for collecting oxygen gas, optionally oxygen gas from outlet 70. Alternatively or additionally, evacuated oxygen gas may be released into a surrounding environment.

In some embodiments of the invention, container 20 further comprises at least one inlet 34, and/or container 60 further comprises at least one inlet 74 configured for receiving (and optionally also for removing) an aqueous solution into the respective container. Inlets 34 and 74 may have any suitable size and configuration, including for example, a relatively narrow inlet (e.g., configured for communicating with a tube) and a window or removable top of the respective container. Reception of a solution through inlet 34 and/or 74 is optionally controlled, for example, by optional valve 36 or 76, respectively, which when closed prevent release of gas or liquid through inlet 34 or 74, respectively. Inlet 34 and outlet 32 may optionally be configured as a single structure (not shown) configured for serving both as a gas outlet (as described herein) and as an inlet (as described herein). Additionally or alternatively, inlet 74 and outlet 72 may optionally be configured as a single structure (not shown).

Optionally and preferably, the electrochemical reaction at electrode 16, 18, 56 and/or 58 is monitored, for example, by means of one or more electrochemical unit (not shown), in communication with the first electrochemical cell (e.g., for monitoring a reaction at electrode 16 and/or 18) and/or second electrochemical cell (e.g., for monitoring a reaction at electrode 56 and/or 58), and optionally being located in container 20 and/or 60, respectively. The electrochemical unit can be configured to measure any parameter pertaining to the operation and/or state of system 10. These include, without limitation, electric potential at electrode 16, 18, 56 and/or 58, pH of solution 40 and/or 80, gas pressure and/or composition (e.g., in container 20 and/or 60), and the like. Electrical signals generated by the electrochemical unit can be transmitted, e.g., via a communication line (not shown) to a remote location (not shown).

In some embodiments, a system for producing hydrogen gas, as described herein, further comprises one or more chambers for a solution for container 20 and/or 60, which is operatively connectable (and optionally connected) to container 20 and/or 60 and is configured to provide the solution (optionally via inlet 34 and/or 74) to the electrodes therein.

The nature and characteristics of the electrodes 16, 18, 56 and/or 58, and solutions 40 and 80, as well as of other components that can be included in the system, are further detailed herein.

The distances between electrodes 16 and 18, electrodes 56 and 58, container walls, and other components, and the shapes of the various components, can be manipulated and are generally as would be recognized by a person skilled in the art. For example, the redox-active electrodes in each container are preferably placed in close proximity to the working electrode in the respective container in order to minimize ohmic and/or concentration polarization losses. Moreover, the active area of the redox-active electrodes are preferably large enough to match an external current between the working electrodes in order to minimize kinetic overpotential which would have to be compensated for by increasing the applied voltage.

In some embodiments of any of the embodiments according to this aspect, the oxidation and/or reduction of a redox-active electrode (a first and/or second redox-active electrode) according to any of the respective embodiments described herein is characterized by a standard redox potential in a range of from 0 to 1.6 $V_{RHE}$. In some such embodiments, the standard redox potential in a range of from 0.05 to 1.55 $V_{RHE}$. In some embodiments, the standard redox potential in a range of from 0.1 to 1.5 $V_{RHE}$. In some embodiments, the standard redox potential in a range of from 0.15 to 1.45 $V_{RHE}$. In some embodiments, the standard redox potential in a range of from 0.2 to 1.4 $V_{RHE}$.

Herein throughout, the phrase "standard redox potential" refers to a redox potential relative to an indicated standard electrode (e.g., a reversible hydrogen electrode), under standard conditions used in the art, e.g., a temperature of 25° C., a partial pressure of 1 atmosphere for each gas that is part of the reaction, and a 1 M concentration of each solute that is part of the reaction (with the exception of hydrogen and hydroxide ions when the standard electrode is an RHE, as discussed below).

Herein, the term "RHE" refers to a reversible hydrogen electrode as used in the art, and "$V_{RHE}$" refers to a potential determined relative to an RHE as standard electrode. For potentials relative to RHE, the standard conditions comprise any pH of a solution being used, for example, an aqueous solution according to any of the respective embodiments described herein.

In some embodiments of any of the embodiments according to this aspect, the oxidation and reduction of a redox-active electrode (a first and/or second redox-active electrode) according to any of the respective embodiments described herein is characterized by a standard redox potential in a range of from 0 to 1.5 $V_{RHE}$. In some such embodiments, the standard redox potential in a range of from 0.05 to 1.45 $V_{RHE}$. In some embodiments, the standard redox potential in a range of from 0.1 to 1.4 $V_{RHE}$. In some embodiments, the standard redox potential in a range of from 0.15 to 1.35 $V_{RHE}$. In some embodiments, the standard redox potential in a range of from 0.2 to 1.3 $V_{RHE}$.

In some embodiments of any of the embodiments according to this aspect, a redox-active electrode according to any of the respective embodiments described herein is characterized by a standard redox potential in a range of from 0 to 0.8 $V_{RHE}$. In some such embodiments, the standard redox potential in a range of from 0.05 to 0.8 $V_{RHE}$. In some embodiments, the standard redox potential in a range of from 0.1 to 0.8 $V_{RHE}$. In some embodiments, the standard redox potential in a range of from 0.15 to 0.8 $V_{RHE}$. In some embodiments, the standard redox potential in a range of from 0.2 to 0.8 $V_{RHE}$.

In some embodiments of any of the embodiments according to this aspect, a redox-active electrode according to any of the respective embodiments described herein is characterized by a standard redox potential in a range of from 0.8 to 1.6 $V_{RHE}$. In some such embodiments, the standard redox potential in a range of from 0.8 to 1.55 $V_{RHE}$. In some embodiments, the standard redox potential in a range of from 0.8 to 1.5 $V_{RHE}$. In some embodiments, the standard redox potential in a range of from 0.8 to 1.45 $V_{RHE}$. In some embodiments, the standard redox potential in a range of from 0.8 to 1.4 $V_{RHE}$.

Without being bound by any particular theory, it is believed that a standard redox potential of at least 0 $V_{RHE}$ in a redox-active electrode, according to any of the respective embodiments described herein, allows the redox-active electrode to be suitable for serving as an anode (e.g., in the first electrochemical cell) during a hydrogen evolution reaction (e.g., according to any of the respective embodiments described herein), for which the standard redox potential is 0 $V_{RHE}$ by definition.

It is further believed that a standard redox potential of 1.6 $V_{RHE}$ or less in a redox-active electrode, according to any of the respective embodiments described herein, allows the redox-active electrode to be suitable for serving as a cathode (e.g., in the second electrochemical cell) during an oxygen evolution reaction (e.g., according to any of the respective embodiments described herein). The standard redox potential of an oxygen-evolution reaction is typically 1.23 $V_{RHE}$, but the reaction is typically significantly inhibited at potentials of less than about 1.6 V.

It is therefore further believed that a standard redox potential in a range of from 0 to 1.6 $V_{RHE}$ in a redox-active electrode, according to any of the respective embodiments described herein, allows the redox-active electrode to be suitable for serving as an anode during a hydrogen evolution reaction and as a cathode during an oxygen evolution reaction (e.g., according to any of the respective embodiments described herein).

In some embodiments of any of the embodiments described herein, a capacity of a redox-active electrode according to any of the respective embodiments described herein to reversibly undergo oxidation and reduction (e.g., a charging capacity) is characterized by an ability to donate, upon reversibly undergoing oxidation, at least 0.01 mole of electrons per liter aqueous solution, optionally at least 0.03 mole of electrons per liter aqueous solution, optionally at least 0.1 mole of electrons per liter aqueous solution, optionally at least 0.3 mole of electrons per liter aqueous solution, and optionally at least 1 mole of electrons per liter aqueous solution.

In some embodiments of any of the embodiments described herein, a capacity of a redox-active electrode according to any of the respective embodiments described herein to reversibly undergo oxidation and reduction (e.g., a charging capacity) is characterized by an ability to donate, upon reversibly undergoing oxidation, at least mole of electrons per 10,000 grams of the electrode, optionally at least 1 mole of electrons per 3,000 grams of the electrode, optionally at least 1 mole of electrons per 1,000 grams of the electrode, optionally at least 1 mole of electrons per 300 grams of the electrode, and optionally at least 1 mole of electrons per 100 grams of the electrode.

In some embodiments of any of the embodiments described herein, a capacity of a redox-active electrode according to any of the respective embodiments described herein to reversibly undergo oxidation and reduction (e.g., a charging capacity) is characterized by an ability to donate, upon reversibly undergoing oxidation, at least mole of electrons per 1,000 cm² of the electrode, optionally at least 1 mole of electrons per 300 cm² of the electrode, optionally at least 1 mole of electrons per 100 cm² of the electrode, optionally at least 1 mole of electrons per 30 cm² of the electrode, and optionally at least 1 mole of electrons per 10 cm² of the electrode.

In some embodiments of any of the embodiments described herein, a redox-active electrode according to any of the respective embodiments described herein comprises a substance which reversibly undergoes oxidation and reduction. In some embodiments, such a substance comprises a transition metal (optionally Ni, Cu, Zn and/or Cd) and/or a metal from the p-block elements (optionally Pb and/or Sn).

A substance which reversibly undergoes oxidation and reduction in a first redox-active electrode and a substance which reversibly undergoes oxidation and reduction in a second redox-active electrode may optionally be the same (e.g., comprising the same metal and/or combination of metals) or different (e.g., comprising a different metal and/or combination of metals).

In some embodiments of any of the embodiments described herein, a redox-active electrode according to any of the respective embodiments described herein comprises a matrix material which includes an electrical conductor, such as a metal (optionally Ni, Pt and/or stainless steel). The matrix material is preferably configured to facilitate transfer of electrons to and from a substance which reversibly undergoes oxidation and reduction.

A matrix material in a first redox-active electrode (if a matrix material is present therein) and a matrix material in a second redox-active electrode (if a matrix material is present therein) may optionally be the same or different.

In some embodiments of any of the embodiments described herein, activation cycles of charge-discharge are performed on any one or more of the redox-active electrodes described herein prior to using the redox-active electrode(s) in a method and/or system described herein. In some embodiments, activation increases the electrode discharge capacity (the ratio of charge transferred during the discharge phase to the charge transferred during the charge phase).

In some embodiments, activation is effected by connecting a redox-active electrode (e.g., an electrode comprising Ni(OH)₂) as a working electrode in a 3-electrode cell, optionally using a Pt electrode as a counter-electrode (and/or a saturated Ag/AgCl electrode as a reference electrode). The electrolyte solution is optionally an NaOH solution, for example, about 1M NaOH. Chrono-potentiometric charge and discharge cycles are optionally carried out until discharge capacity reaches a plateau, constituting an activation phase.

In some embodiments of any of the embodiments described herein, a redox-active electrode according to any of the respective embodiments described herein comprises nickel, for example, in a form of Ni(OH)₂ and/or a nickel oxyhydroxide. In some embodiments, a reversible oxidation of the redox-active electrode comprises oxidation of Ni(OH)₂ (e.g., in a β-Ni(OH)₂ phase) to a nickel oxyhydroxide (e.g., in a β-nickel oxyhydroxide phase) in the presence of hydroxide ions, and a reduction of the redox-active electrode comprises reduction of nickel oxyhydroxide (e.g., β-nickel oxyhydroxide) to Ni(OH)₂ (e.g., β-Ni(OH)₂) in the presence of water.

Herein, the term "nickel oxyhydroxide" encompasses any compound having the formula Ni(O)$_i$(OH)$_{2-i}$ wherein i is a positive number (optionally fractional) less than 2. It is to be understood that reference herein to "NiOOH" (i.e., wherein i is 1) represents a convention (in accordance with common practice in the art) used for describing nickel oxyhydroxide in a convenient manner, and is not intended to exclude nickel oxyhydroxide having a different value for i. In some embodiments of any of the embodiments described herein, i is in a range of from 0.5 to 1.5. In some such embodiments, i is about 1.

Herein, the terms "Ni(OH)₂" and "nickel oxyhydroxide" each encompasses hydrates and/or complexes (e.g., complexes with hydroxide ion and/or H₂O) of the compounds according to the respective formulas described herein.

A reversible oxidation of Ni(OH)₂ (e.g., in a first redox-active electrode) may optionally be represented by the formula:

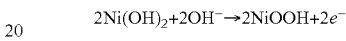

2Ni(OH)₂+2OH⁻→2NiOOH+2e⁻

The hydroxide ion consumed by such a reaction may be, for example, hydroxide ion produced in the same electrochemical cell upon reduction of water to generate hydrogen gas (e.g., at a first working electrode).

A reversible reduction of NiOOH (e.g., in a second redox-active electrode) may optionally be represented by the formula:

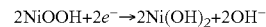

2NiOOH+2e⁻→2Ni(OH)₂+2OH⁻

The hydroxide ion produced by such a reaction may, for example, be oxidized in the same electrochemical cell to generate oxygen gas and water (e.g., at a second working electrode).

In some embodiments of any of the embodiments described herein relating to two connectable and/or connected electrochemical cells, each cell having a Ni(OH)₂/NiOOH-based redox-active electrode, the primary redox reactions effected in the cells and energy balance thereof may be represented by Scheme 1:

Scheme 1

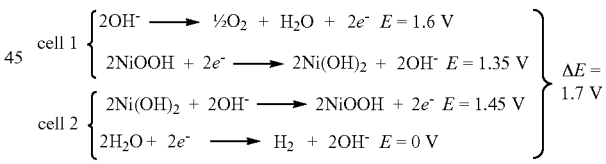

$$\text{cell 1} \begin{cases} 2\text{OH}^- \longrightarrow \tfrac{1}{2}\text{O}_2 + \text{H}_2\text{O} + 2e^- \quad E = 1.6 \text{ V} \\ 2\text{NiOOH} + 2e^- \longrightarrow 2\text{Ni(OH)}_2 + 2\text{OH}^- \quad E = 1.35 \text{ V} \end{cases}$$
$$\text{cell 2} \begin{cases} 2\text{Ni(OH)}_2 + 2\text{OH}^- \longrightarrow 2\text{NiOOH} + 2e^- \quad E = 1.45 \text{ V} \\ 2\text{H}_2\text{O} + 2e^- \longrightarrow \text{H}_2 + 2\text{OH}^- \quad E = 0 \text{ V} \end{cases}$$
$$\Delta E = 1.7 \text{ V}$$

In Scheme 1, the potential for the nickel reactions are between the potential for the HER (0 V) and the potential for the OER (1.6 V). The redox potential for the Ni(OH)₂/NiOOH is about 1.4 V, with actual potential being 1.35 V for reduction and 1.45 V for oxidation due to an overpotential of about 0.5 V. The difference of 0.1 V represents the excess potential required for water electrolysis (due to the oxidation and reduction of the redox-active electrodes) in addition to the 1.6 V required for water electrolysis per se. It is to be understood that all of the potentials recited in Scheme 1 are purely exemplary, and will vary depending on the specific electrodes, aqueous solution pH and/or other conditions (potentials are in V$_{RHE}$ units).

Figure 8:
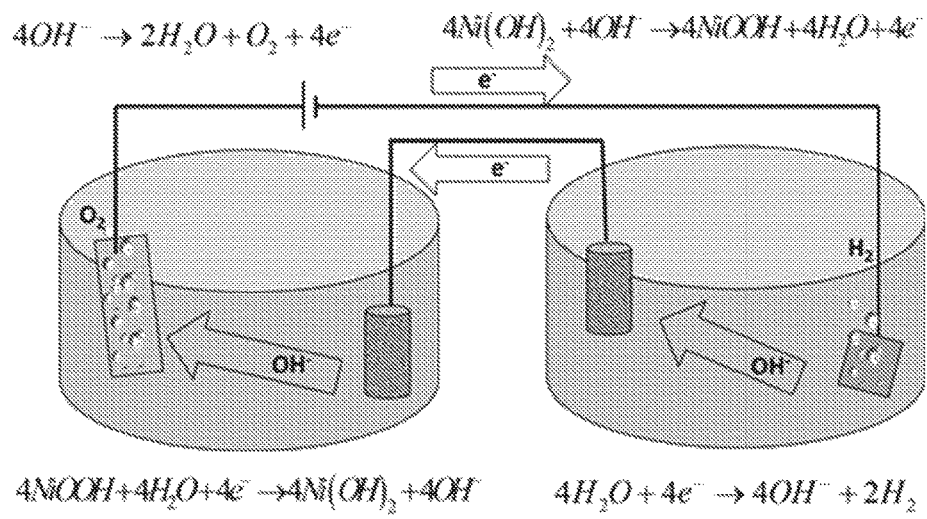
FIG. 8 presents a schematic illustration of a 2-cell system according to some embodiments of the present invention, showing H$_2$ generation at a HER electrode, O$_2$ generation at an OER electrode, Ni(OH)$_2$/NiOOH accessory electrodes connecting the cells, OH$^-$ as an electrolyte, and redox reactions at each electrode.

A system comprising two compartments with Ni(OH)₂/NiOOH-based redox-active electrodes according to some embodiments of the invention, and oxidation and reduction reactions therein, is depicted in FIG. 8.

Without being bound by any particular theory, it is believed that Ni(OH)$_2$/nickel oxyhydroxide provides electrodes with excellent cycling durability and highly reversible oxidation and reduction reactions. It is further believed that cycling between β-Ni(OH)$_2$ and β-NiOOH phases provides especially reversible oxidation and reduction reactions.

In some embodiments of any of the embodiments described herein, at least a portion of the Ni(OH)$_2$ and/or NiOOH in a redox-active electrode is in a β-Ni(OH)$_2$ or β-NiOOH phase. In some embodiments, at least 50% (as a molar percentage of Ni) of the Ni(OH)$_2$ and/or NiOOH is in a β-Ni(OH)$_2$ or β-NiOOH phase. In some embodiments, at least 75% of the Ni(OH)$_2$ and/or NiOOH is in a β-Ni(OH)$_2$ or β-NiOOH phase. In some embodiments, at least 80% of the Ni(OH)$_2$ and/or NiOOH is in a β-Ni(OH)$_2$ or β-NiOOH. In some embodiments, at least 90% of the Ni(OH)$_2$ and/or NiOOH is in a β-Ni(OH)$_2$ or β-NiOOH phase. In some embodiments, at least 95% of the Ni(OH)$_2$ and/or NiOOH is in a β-Ni(OH)$_2$ or β-NiOOH phase. In some embodiments, at least 98% of the Ni(OH)$_2$ and/or NiOOH is in a β-Ni(OH)$_2$ or β-NiOOH phase. In some embodiments, at least 99% of the Ni(OH)$_2$ and/or NiOOH is in a β-Ni(OH)$_2$ or β-NiOOH phase. In some embodiments, substantially all of the Ni(OH)$_2$ and/or NiOOH is in a β-Ni(OH)$_2$ or β-NiOOH phase.

Without being bound by any particular theory, it is believed that reversible oxidation and reduction of Ni(OH)$_2$ and/or NiOOH is represented by the following general Scheme 2 (e.g., as described in Oliva et al. [*Journal of Power Sources* 1982, 8:229-255], Briggs & Fleischmann [*Transactions of the Faraday Society* 1971, 67:2397-2407], Bode et al. [*Electrochimica Acta* 1966, 11:1079-1087] and/or Bode et al. [*Zeitschrift fur anorganische und allgemeine Chemie* 1969, 366]).

Scheme 2

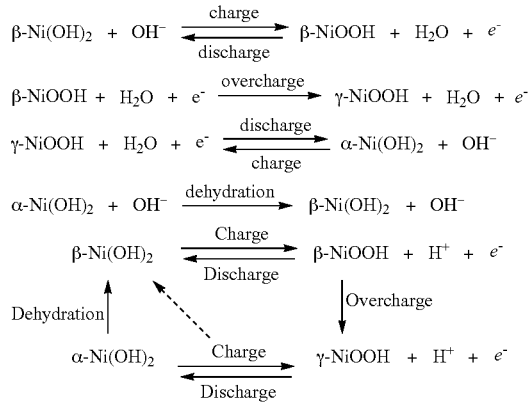

In accordance with the above scheme, it is further believed that overcharging of β-Ni(OH)$_2$ may lead to the formation of γ-NiOOH from β-NiOOH, which is associated with an increase in interlayer spacing from 4.7 to 7 Å, which may result in swelling of the electrode.

The formation of γ-NiOOH may be associated with an intercalation of water molecules and cations which results in deterioration of capacity on cycling. When γ-NiOOH is formed, inaccessible regions of nickel hydroxide may be created within the electrode which become electrically isolated or inactive.

Without being bound by any particular theory, it is further believed that an increase of charging time may lead to decrease in Ni(OH)$_2$ (e.g., due at least in part to conversion to NiOOH) and/or an increase in voltage. At a certain limit, the oxygen evolution reaction may begin to be a significant (even dominant) reaction, and oxygen gas bubbles may appear on the nickel-containing redox-active electrode. Oxygen generation and deterioration associated with formation of γ-NiOOH may be linked, for example, by formation of γ-NiOOH being promoted by over-oxidation and by the OER.

In some embodiments of any of the embodiments described herein, a first voltage and/or a time period during which it is applied are selected so as to minimize or avoid electrode overcharging and consequent γ-NiOOH formation.

In some embodiments, activation of a redox-active electrode comprising β-Ni(OH)$_2$ is effected by connecting the electrode as a working electrode in a 3-electrode cell (e.g., as described herein), and applying a current between the working electrode and counter-electrode such that β-Ni(OH)$_2$ is charged (by being partially converted to β-NiOOH) while avoiding overcharge and γ-NiOOH formation. The activation cycle may then optionally be continued by effecting discharge of partially charged β-Ni(OH)$_2$/β-NiOOH, by applying a reverse current. The activation cycle may then optionally be repeated any number of times.

The first working electrode according to any of the respective embodiments described herein may be composed of any material suitable for a cathode at which a hydrogen evolution reaction occurs, e.g., according to any of the embodiments described herein relating to an electrode for effecting a hydrogen evolution reaction.

In some embodiments, the first working electrode comprises a photocathode material, as described herein.

In some embodiments, the first working electrode is composed of any material suitable both for a cathode at which a hydrogen evolution reaction occurs and for an anode at which an oxygen evolution reaction occurs, e.g., according to any of the embodiments described herein relating to an electrode for effecting an oxygen evolution reaction (e.g., under alkaline conditions). Such a working electrode may be used, for example, in embodiments wherein a hydrogen evolution reaction and an oxygen evolution reaction occur at the first working electrode at different times.

The second working electrode according to any of the respective embodiments described herein may be composed of any material suitable for an anode at which an oxygen evolution reaction occurs, e.g., according to any of the embodiments described herein relating to an electrode for effecting an oxygen evolution reaction.

The second working electrode may optionally be identical to the first working electrode in chemical composition (e.g., with respect to species and/or concentration of substances therein) or different than the first working electrode.

In some embodiments, the second working electrode comprises a photoanode material, as described herein. In some such embodiments, the first working electrode comprises a photocathode material, as described herein.

In some embodiments, the second working electrode is composed of any material suitable both for a cathode at which a hydrogen evolution reaction occurs (e.g., according to any of the embodiments described herein relating to an electrode for effecting a hydrogen evolution) reaction and for an anode at which an oxygen evolution reaction occurs (e.g., under alkaline conditions). Such a working electrode may be used, for example, in embodiments wherein a hydrogen evolution reaction and an oxygen evolution reaction occur at the second working electrode at different times.

In some embodiments of any of the embodiments relating to a working electrode comprising a photocathode or photoanode, hydrogen generation occurs only at the first working electrode (e.g., a second voltage having a polarity opposite that of the first voltage is not applied).

In some embodiments of any of the embodiments described herein, the second working electrode (and optionally also the first working electrode) is characterized by an OER (oxygen evolution reaction) kinetic potential of no more than 2.0 $V_{RHE}$. In some embodiments, the OER kinetic potential is no more than 1.9 $V_{RHE}$. In some embodiments, the OER kinetic potential is no more than 1.8 $V_{RHE}$. In some embodiments, the OER kinetic potential is no more than 1.7 $V_{RHE}$. In some embodiments, the OER kinetic potential is no more than 1.6 $V_{RHE}$. In some embodiments, the OER kinetic potential is no more than 1.55 $V_{RHE}$. In some embodiments, the OER kinetic potential is no more than 1.5 $V_{RHE}$. In some embodiments, the OER kinetic potential is no more than 1.45 $V_{RHE}$. In some embodiments, the OER kinetic potential is no more than 1.4 $V_{RHE}$. In some embodiments, the OER kinetic potential is no more than 1.35 $V_{RHE}$.

Herein, the phrase "OER kinetic potential" refers to a potential (e.g., relative to a reversible hydrogen electrode (RHE)) at which electric current passing through an electrode at which an OER is effected is 100 mA per cm$^2$ (area of the electrode at which OER is effected), optionally under similar conditions as used for determination of a standard redox potential.

The kinetic potential may optionally be regarded as a sum of an OER redox potential (e.g., 1.23 $V_{RHE}$) and an overpotential associated with the OER.

In some embodiments of any of the embodiments described herein, the second working electrode (and optionally also the first working electrode) is characterized by an OER (oxygen evolution reaction) kinetic potential which is at least 0.05 V higher than a redox potential (e.g., standard redox potential) associated with a reversible oxidation and reduction of the first and/or second redox-active electrodes. In some embodiments, the second working electrode (and optionally also the first working electrode) is characterized by an OER kinetic potential which is at least 0.1 V higher than a redox potential associated with a reversible oxidation and reduction of the first and/or second redox-active electrodes. In some embodiments, the second working electrode (and optionally also the first working electrode) is characterized by an OER kinetic potential which is at least 0.15 V higher than a redox potential associated with a reversible oxidation and reduction of the first and/or second redox-active electrodes. In some embodiments, the second working electrode (and optionally also the first working electrode) is characterized by an OER kinetic potential which is at least 0.2 V higher than a redox potential associated with a reversible oxidation and reduction of the first and/or second redox-active electrodes.

Without being bound by any particular theory, it is believed that a considerable voltage difference between a redox potential and a (higher) OER kinetic potential at a working electrode allows the OER to proceed at a considerable rate at a working electrode as current flows from one working electrode to the other via redox reactions at the first and second redox-active electrodes.

In some embodiments of any of the embodiments described herein, the first redox-active electrode (and optionally also the second redox-active electrode) is characterized by an OER (oxygen evolution reaction) kinetic potential which is at least 0.1 V higher than a redox potential (e.g., standard redox potential) associated with a reversible oxidation and reduction of the redox-active electrode. In some embodiments, the first redox-active electrode (and optionally also the second redox-active electrode) is characterized by an OER kinetic potential which is at least 0.1 V higher than a redox potential associated with a reversible oxidation and reduction of the redox-active electrode. In some embodiments, the first redox-active electrode (and optionally also the second redox-active electrode) is characterized by an OER kinetic potential which is at least 0.15 V higher than a redox potential associated with a reversible oxidation and reduction of the redox-active electrode. In some embodiments, the first redox-active electrode (and optionally also the second redox-active electrode) is characterized by an OER kinetic potential which is at least 0.2 V higher than a redox potential associated with a reversible oxidation and reduction of the redox-active electrode. In some embodiments, the first redox-active electrode (and optionally also the second redox-active electrode) is characterized by an OER kinetic potential which is at least 0.25 V higher than a redox potential associated with a reversible oxidation and reduction of the redox-active electrode. In some embodiments, the first redox-active electrode (and optionally also the second redox-active electrode) is characterized by an OER kinetic potential which is at least 0.3 V higher than a redox potential associated with a reversible oxidation and reduction of the redox-active electrode.

Without being bound by any particular theory, it is believed that a considerable voltage difference between a redox potential and a (higher) OER kinetic potential allows oxidation at a redox-active electrode in an electrochemical cell where hydrogen gas is being produced (at the working electrode) to proceed by oxidation of the redox-active electrode substantially without oxidation of hydroxide ion to generate oxygen gas, which could contaminate the hydrogen gas.

According to an aspect of some embodiments of the invention, there is provided a method for generating hydrogen gas from an aqueous solution. The method comprises applying a voltage (referred to herein as the "first voltage") between a first working electrode (e.g., according to any of the respective embodiments described herein) of a first electrochemical cell and a second working electrode (e.g., according to any of the respective embodiments described herein) of a second electrochemical cell, wherein the first electrochemical cell further comprises a first redox-active electrode (e.g., according to any of the respective embodiments described herein), and the second electrochemical cell further comprises a second redox-active electrode (e.g., according to any of the respective embodiments described herein), and the first and second redox-active electrodes are electrically connected to one another (e.g., by an electrical conductor such as electric wire that allows electrons to flow from one redox-active electrode to the other, optionally upon application of a voltage to the redox-active electrodes).

In some embodiments, the first and/or second electrochemical cell further comprises an aqueous solution (e.g., an aqueous solution according to any of the respective embodiments described herein).

In some embodiments, the method comprises contacting the working electrodes and redox-active electrodes in the first and/or second electrochemical cell with an aqueous solution (e.g., an aqueous solution according to any of the respective embodiments described herein), for example, by introducing the electrodes to an aqueous solution or by introducing an aqueous solution to a compartment comprising the electrodes.

The method preferably comprises concomitantly effecting (e.g., upon application of a sufficiently high first voltage):

reduction of water in an aqueous solution in the first electrochemical cell at the first working electrode, to thereby generate hydrogen gas and hydroxide ions;

oxidation of hydroxide ions (e.g., in an aqueous solution in the second electrochemical cell) at the second working electrode, to thereby generate oxygen gas and water;

oxidation in the presence of hydroxide ions of the first redox-active electrode (optionally comprising consuming hydroxide ions); and reduction in the presence of water of the second redox-active electrode (optionally comprising generating hydroxide ions).

By effecting the abovementioned four steps, a current may optionally flow between the first working electrode and second working electrode so as to complete a circuit, for example, by:

transfer of negatively charged hydroxide ions in the first electrochemical cell from the first working electrode (where they are generated upon donation of electrons by the working electrode) to the first redox-active electrode (where they are optionally consumed upon oxidation of the electrode), which accepts electrons;

transfer of electrons from the first redox-active electrode to the second redox-active electrode, which then donates electrons; and transfer of hydroxide ions in the second electrochemical cell from the second redox-active electrode (where they are optionally generated) to the second working electrode (where they are oxidized to oxygen gas and water), which accepts electrons that can then flow towards the first working electrode to complete a circuit.

A combination of transfer of ions (e.g., hydroxide ions) in the electrochemical cells, together with transfer of electrons from a redox-active electrode of one cell to a redox-active electrode of the other cell, has a similar effect as transfer of ions in a simple electrochemical cell (e.g., via an ion exchange membrane and/or salt bridge), in facilitating closing of an electrical circuit.

In some embodiments of any of the embodiments according to this aspect, a suitable first voltage is at least 1.5 V. In some embodiments, the first voltage is in a range of from 1.5 to 2.2 V. In some embodiments, the first voltage is in a range of from 1.5 to 2.0 V. In some embodiments, the first voltage is in a range of from 1.5 to 1.8 V. In some embodiments, the first voltage is in a range of from 1.5 to 1.7 V.

In some embodiments, a suitable first voltage is at least 1.6 V. In some embodiments, the first voltage is in a range of from 1.6 to 2.2 V. In some embodiments, the first voltage is in a range of from 1.6 to 2.0 V. In some embodiments, the first voltage is in a range of from 1.6 to 1.8 V.

In some embodiments, a suitable first voltage is at least 1.7 V. In some embodiments, the first voltage is in a range of from 1.7 to 2.2 V. In some embodiments, the first voltage is in a range of from 1.7 to 2.0 V. In some embodiments, the first voltage is in a range of from 1.7 to 1.9 V.

In some embodiments, a suitable first voltage is at least 1.8 V. In some embodiments, the first voltage is in a range of from 1.8 to 2.2 V. In some embodiments, the first voltage is in a range of from 1.8 to 2.0 V.

A suitable first voltage may depend on the specific conditions such as the particular working electrodes and/or redox-active electrodes used, and the overpotentials associated with electrolysis of water and oxidation and/or reduction of the redox-active electrodes under such conditions (e.g., overpotentials associated with such electrodes). Determining a suitable voltage (e.g., a voltage sufficiently high to effect electrolysis of water, as described herein) for any given conditions will be well within the capabilities of the skilled person.

In some embodiments of any of the embodiments according to this aspect, the first and second electrochemical cells are both comprised within a system (e.g., a system according to any of the aspects described herein relating to a system with a first electrochemical and a second electrochemical cell).

In some embodiments of any of the embodiments according to this aspect, the first electrochemical cell comprises a first container, the first working electrode and the first redox-active electrode being in the first container, and the first container having therein an aqueous solution.

In some embodiments of any of the embodiments according to this aspect, the second electrochemical cell comprises a second container, the second working electrode and the second redox-active electrode being in the second container, and the second container having therein an aqueous solution. An aqueous solution in the second electrochemical cell may optionally be the same as, or different than, an aqueous solution in the first electrochemical cell, for example, with respect to chemical composition, solute concentration, temperature, pressure, volume, flow and/or circulation rate.

In some embodiments of any of the embodiments according to this aspect, the first and second containers are separated from each other.

In some embodiments of any of the embodiments according to this aspect, at least one of the first and second redox-active electrodes, and preferably each of the first and second redox-active electrodes is capable of reversibly undergoing oxidation and reduction.

In some embodiments of any of the embodiments according to this aspect, the reversible oxidation of a redox-active electrode comprises oxidation in the presence of hydroxide ions (optionally comprising consuming hydroxide ions) and the reversible reduction of a redox-active electrode comprises reduction in the presence of water (optionally comprising consuming water molecules) to thereby produce hydroxide ions. In some embodiments, the oxidation and reduction reactions are mirror images of one another, for example, wherein oxidation consumes hydroxide ion and generates water, and reduction consumes water and generates hydroxide ion.

In some embodiments of any of the embodiments according to this aspect, the method further comprises collecting at least a portion of the generated hydrogen gas (e.g., by collecting hydrogen gas from the first electrochemical cell).

In some embodiments of any of the embodiments according to this aspect, the method further comprises collecting at least a portion of the generated oxygen gas (e.g., by collecting oxygen gas from the second electrochemical cell).

Upon oxidation of the first redox-active electrode and/or reduction of the second redox-active electrode, depletion of reduced material in the first redox-active electrode capable of being oxidized and/or depletion of oxidized material in the second redox-active electrode capable of being reduced may eventually pose an obstacle to further hydrogen gas generation.

In some embodiments of any of the embodiments according to this aspect, the method further comprises (subsequent to application of the first voltage), replenishing the first redox-active electrode with reduced material capable of being oxidized and/or replenishing the second redox-active electrode with oxidized material capable of being reduced, to thereby allow further hydrogen gas generation.

Herein, "replenishing" an electrode with a material encompasses, but is not limited to, replacing an electrode with another electrode comprising the material.

In some embodiments of any of the embodiments according to this aspect, the method further comprises replacing the first redox-active electrode with the second redox-active electrode and/or replacing the second redox-active electrode with the first redox-active electrode (e.g., following oxidation of the first redox-active electrode and reduction of the second redox-active electrode). In such a manner, a first redox-active electrode replenished with reduced material capable of being oxidized (an electrode which was previously the second redox-active electrode) and/or a second redox-active electrode replenished with oxidized material capable of being reduced (an electrode which was previously the first redox-active electrode) may optionally be provided.

In some embodiments, upon replacing the first redox-active electrode with the second redox-active electrode and/or replacing the second redox-active electrode with the first redox-active electrode, a first voltage according to any of the respective embodiments described herein may optionally then be applied, to thereby generate further hydrogen gas. In some embodiments, cycles of replacing the first and/or second redox-active electrode followed by application of a first voltage may be repeated at least once, and optionally any number of times, for example, at least 5 times, at least at least 10 times, at least 30 times, at least 100 times, at least 300 times, and optionally at least 1,000 times. In each cycle of the method according to such embodiments, hydrogen gas may optionally be collected from the first electrochemical cell and oxygen gas may optionally be collected from the second electrochemical cell.

In some embodiments of any of the embodiments according to this aspect, the method further comprises applying, subsequently to the first voltage, a second voltage between the first working electrode and the second working electrode, the second voltage having an opposite polarity with respect to the first voltage (e.g., such that current induced by the second voltage is in the opposite direction as current induced by the first voltage).

The second voltage may optionally be applied so as to effect replenishing of the first and/or second redox-active electrodes, e.g., for a time period suitable for replenishing the first and/or second redox-active electrodes.

In some embodiments of any of the embodiments according to this aspect, the second voltage is sufficient to concomitantly effect oxidation of the second redox-active electrode (e.g., in the presence of hydroxide ions) and reduction of the first redox-active electrode (e.g., in the presence of water), according to any of the respective embodiments described herein.

In some embodiments of any of the embodiments according to this aspect, the second voltage is sufficient to concomitantly effect reduction of water in the aqueous solution to thereby generate hydrogen gas and hydroxide ions at the second working electrode (according to any of the respective embodiments described herein), and oxidation of hydroxide ions to thereby generate oxygen gas and water at the first working electrode (according to any of the respective embodiments described herein), optionally concomitantly with oxidation of the second redox-active electrode and reduction of the first redox-active electrode as described hereinabove. In some such embodiments, the method further comprises collecting hydrogen gas (generated at the second working electrode) from the second electrochemical cell and/or oxygen gas (generated at the first working electrode) from the first electrochemical cell, e.g., subsequently to and/or concomitantly with application of the second voltage.

In some embodiments of any of the embodiments according to this aspect, gas is evacuated from the first and/or second electrochemical cell between application of the first and second voltages (e.g., subsequent to application of the first voltage and prior to application of the second voltage and/or vice versa), for example, in order to minimize contamination of hydrogen gas (or oxygen gas) generated at a working electrode with oxygen gas (or hydrogen gas) generated at the same working electrode in response to a different voltage.

In some embodiments of any of the embodiments according to this aspect, the second voltage is a voltage described as being suitable for the first voltage according to any of the respective embodiments described herein. In some embodiments, the second voltage is at least 1.5 V, optionally at least 1.6 V, optionally at least 1.7 V and optionally at least 1.8 V (according to any of the respective embodiments described herein).

By applying a second voltage according to some of the embodiments herein, a first redox-active electrode replenished with reduced material capable of being oxidized and/or a second redox-active electrode replenished with oxidized material capable of being reduced may optionally be provided, optionally while continuing to generate (and optionally collect) hydrogen and oxygen gas in separate locations.

In some embodiments, subsequent to application of the second voltage, a first voltage according to any of the respective embodiments described herein may optionally then be applied, to thereby generate further hydrogen gas. In some embodiments, cycles of application of the first voltage followed by application of the second voltage may be repeated at least once, and optionally any number of times, for example, at least 5 times, at least at least 10 times, at least 30 times, at least 100 times, at least 300 times, and optionally at least 1,000 times.

In some embodiments of any of the embodiments according to this aspect, application of a first voltage and/or a second voltage according to any of the respective embodiments described herein is effected until a potential difference between the working electrodes reaches a pre-determined limit (e.g., about 2.5 V, about 2.75 V, about 3 V, about 3.25 V) at a pre-determined current (e.g., when the process is performed amperometrically) and/or when the ratio to potential difference to current reaches a pre-determined limit.

In some embodiments of any of the embodiments according to this aspect, application of a first voltage and/or a second voltage according to any of the respective embodiments described herein is effected until a current between the working electrodes drops to a pre-determined limit (e.g., about 2.5 V, about 2.75 V, about 3 V, about 3.25 V) at a pre-determined voltage (e.g., when the process is performed potentiometrically), optionally at a constant first voltage and/or a second voltage described herein.

According to any of the embodiments relating to a system according to any of the aspects described herein, the system may optionally be configured to operate in a batch process, a semi-continuous process and/or a continuous process.

According to any of the embodiments relating to a method according to any of the aspects described herein, the method may optionally be effected as a batch process, a semi-continuous process and/or a continuous process.

In any of the embodiments described herein relating to a batch process, an electrolyte and/or electrolyte solution may optionally be placed in one or more electrochemical cells described herein and regenerated to maintain a concentration, volume and/or chemical composition during operation.

In any of the embodiments described herein relating to a continuous and/or semi-continuous process, an electrolyte and/or electrolyte solution may optionally be constantly regenerated.

Figure 2:
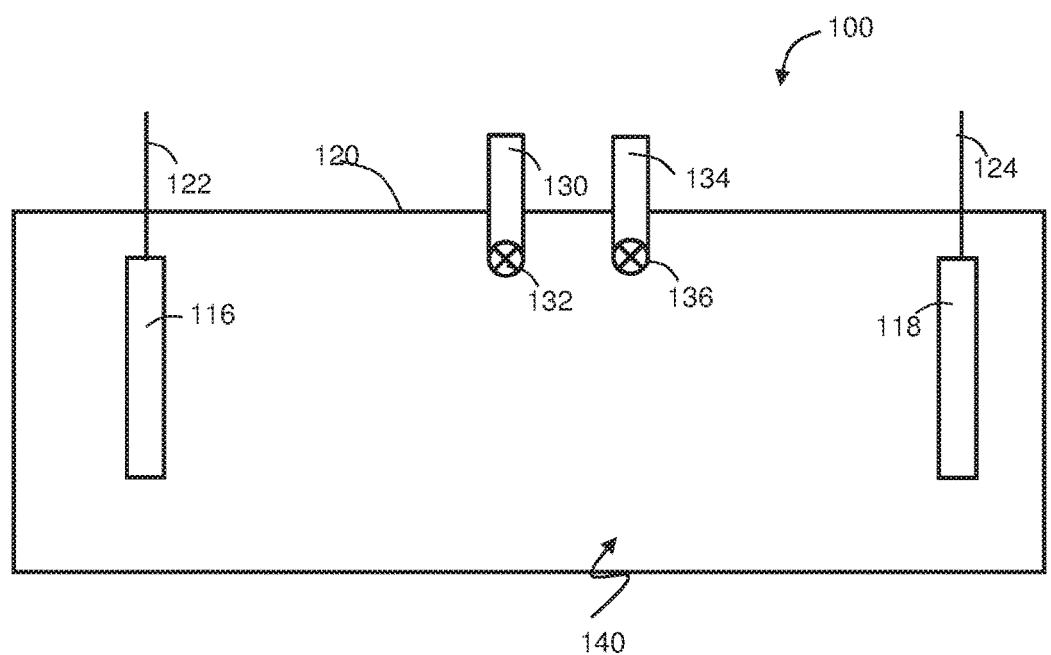
FIG. 2 presents a scheme showing a system for producing hydrogen according to some embodiments of the invention, wherein hydrogen and oxygen may be generated sequentially in the same compartment.

Separated Hydrogen and Oxygen Evolution in Single Compartment:

Referring again to the drawings, FIG. 2 generally illustrates a system 100 for producing hydrogen according to aspect of some embodiments of the invention.

In the representative example illustrated in FIG. 2, system 100 is composed of a container 120 which comprises a working electrode 118 and a redox-active electrode 116 and, when the system is operated, an aqueous solution 140, preferably an aqueous electrolyte solution, at least partially fills container 120. Working electrode 118 or part thereof (e.g., the lower part) and redox-active electrode 116 or part thereof (e.g., the lower part) is kept in contact with aqueous solution 140 during operation of the system. Container 120 and electrodes 116 and 118 are together (with or without aqueous solution 140) collectively referred to herein and as an "electrochemical cell".

In some embodiments, container 120 is non-partitioned, that is, the container is devoid of a partition (e.g., an ion exchange membrane) between electrode 118 and electrode 116, which prevents flow of a gas from electrode 118 to electrode 116 or vice versa. However, embodiments wherein container 120 is partitioned (optionally by an ion exchange membrane) are also contemplated herein.

In some such embodiments, system 100 is devoid of any ion exchange membrane. Absence of a membrane may optionally reduce a cost and/or enhance a durability of the system, and/or allow operation of the system at higher gas pressures.

In some alternative embodiments, container 120 contains a partition (e.g., an ion exchange membrane) which does not prevent flow of a gas from electrode 118 to electrode 116 or vice versa, but does inhibit flow of solution between electrode 118 and electrode 116, for example, by the partition being positioned in the solution but not in at least a portion of a gas-containing volume of the container (e.g., a volume above the solution). Such a partition may optionally enhance a durability of the system, and/or allow operation of the system at higher gas pressures, as a gas pressure will be equal on both sides of the partition, thereby reducing stress.

Redox-active electrode 116 is capable of reversibly undergoing oxidation in the presence of hydroxide ions (optionally in response to a first applied voltage), and undergoing reduction in the presence of water (optionally in response to a second applied voltage and/or thermal stimulation), the reduction optionally producing hydroxide ions and/or molecular oxygen, according to any of the embodiments described herein relating to redox-active electrodes, and optionally according to any of the embodiments described in this section (relating to separated hydrogen and oxygen evolution in a single compartment). In some embodiments, redox-active electrode 116 comprises $Ni(OH)_2$ and/or a nickel oxyhydroxide, at least a portion of which is typically found on the surface of electrode 116, preferably at a part which is in contact with solution 140.

Solution 140, according to some embodiments of the invention, comprises a metal hydroxide electrolyte as discussed herein, such as, for example, a metal alkali hydroxide, dissolved or suspended in an aqueous solution.

In some embodiments, electrodes 118 and 116 are connectable to a power source (as this phrase is defined herein), such as a DC power source. The power source may optionally be a battery, a capacitor, a power generation device (e.g., of a power plant), a photovoltaic (PV) power source or any combination thereof.

Electrode 118 may optionally comprise a photocathode (according to any of the respective embodiments described herein) which serves as a power source, wherein electrodes 116 is connectable to electrode 118.

In various exemplary embodiments of the invention, system 100 further comprises electrical leads 122 and/or 124 for connecting electrodes 116 and/or 118 to an electric power source, so as to generate an electric potential difference between electrodes 116 and 118. Upon such connection, electrons begin to flow from electrode 116 to electrode 118 or vice versa, depending on the polarity of the electric potential difference. The electrical current flowing in the thus closed electrical circuit can be measured and optionally monitored using a current measuring device operationally connectable (optionally connected) in serial to the electric power source (not shown). Other parameters, such as voltage, can also be measured, if desired, as known in the art.

In some embodiments, the system further comprises a reference electrode (e.g., as exemplified herein). The reference electrode is optionally configured for monitoring, e.g., voltage.

In various exemplary embodiments of the invention, when electrons flow from electrode 116 to electrode 118, negatively charged hydroxide ions in solution 140 flow towards electrode 116 and away from electrode 118, and react so as to oxidize redox-active electrode 116. In addition, the vicinity of working electrode 118 consequently becomes more acidic, thereby facilitating reduction of hydrogen ions in water at working electrode 118 so as to generate hydrogen gas.

Alternatively or additionally, when electrons flow (according some embodiment described herein) from electrode 118 to electrode 116, negatively charged hydroxide ions in solution 140 flow towards electrode 118 and away from electrode 116, and are oxidized at electrode 118 so as to generate oxygen gas. In addition, the vicinity of redox-active electrode 116 consequently become more acidic, thereby facilitating reduction of redox-active electrode 116 (e.g., so as to generate hydroxide ions).

In various exemplary embodiments of the invention, redox-active electrode 116 is capable of undergoing reduction effected by production of molecular oxygen (e.g., according to any of the respective embodiments described herein), optionally in the absence of a voltage applied to the system. In some such embodiments, a rate of production molecular oxygen is increased by a rise in temperature in a vicinity of redox-active electrode 116 (e.g., according to any of the respective embodiments described herein).

In some embodiments, system 100 further comprises a heat source (not shown) configured for producing a rise in temperature of redox-active electrode 116. A heat source may optionally be located within electrode 116, and/or in the vicinity thereof (optionally adjacent to the electrode). Alternatively or additionally, a heat source is configured heating an aqueous solution in the system (e.g., prior to, subsequently to and/or concomitantly with entry of the solution into container 120.

In some embodiments of the invention, system 100 further comprises at least one gas outlet 130, for allowing evacuation of hydrogen gas and/or oxygen gas out of container 120. Evacuation of a gas through gas outlet 130 is optionally controlled, for example, by optional valve 132, which when closed prevents release of gas through gas outlet 130, respectively, and isolates previously evacuated gas from container 120. The evacuated hydrogen gas and/or oxygen gas can optionally be collected in a reservoir (not shown) configured for collecting the gas. Preferably, evacuated hydrogen gas is collected in a reservoir (not shown) configured for collecting hydrogen gas. Thus, in some embodiments of the present invention a gas (e.g., hydrogen gas) is conveyed, e.g., by means of a gas conveying tube (not shown), to the reservoir or any other external location.

In some embodiments of the invention, system 100 comprises at least two of gas outlet 130 (not shown separately), each of which independently optionally comprises valve 132 (as described hereinabove). Any two or more gas outlets optionally may communicate with a main volume of container 120 via a single opening (e.g., wherein two or more gas outlets merge to form a single conduit in direct communication with the main volume) and/or each of any two or more gas outlets may communicate separately with the main volume of container 120.

In some embodiments, a first gas outlet is configured for allowing evacuation of hydrogen gas out of container 120 and a second gas outlet is configured for allowing evacuation of oxygen gas out of container 120, and a gas (e.g., hydrogen gas) evacuated via the first gas outlet is isolated from a gas (e.g., oxygen gas) evacuated via the second gas outlet. The evacuated hydrogen gas and/or oxygen gas can optionally be collected in a reservoir (not shown) configured for collecting the gas (as described hereinabove). Preferably, evacuated hydrogen gas is collected in a reservoir (not shown) configured for collecting hydrogen gas from the first gas outlet.

In some embodiments, system 100 and/or container 120 is configured for alternating between a hydrogen-generation mode and an oxygen-generation mode. The hydrogen-generation mode is optionally characterized at least by a first gas outlet 130 (as described herein) being configured for evacuating hydrogen gas from the container (e.g., wherein valve 132 of the first gas outlet is open and/or the first gas outlet is in communication with a hydrogen gas reservoir) and a second gas outlet 130 (as described herein) being closed (e.g., wherein valve 132 of the second gas outlet is closed). The oxygen-generation mode is optionally characterized at least by a second gas outlet 130 (as described herein) being configured for evacuating oxygen gas from the container (e.g., wherein valve 132 of the second gas outlet is open, and/or the second gas outlet is in communication with an oxygen gas reservoir) and a first gas outlet 130 (as described herein) being closed (e.g., wherein valve 132 of the first gas outlet is closed).

In some embodiments of the invention, container 120 further comprises at least one inlet 134 configured for receiving (and optionally also for removing) an aqueous solution into the container. Inlet 134 have any suitable size and configuration, including for example, a relatively narrow inlet (e.g., configured for communicating with a tube) and a window or removable top of container 120. Reception of a solution through inlet 134 is optionally controlled, for example, by optional valve 136, which when closed prevent release of gas or liquid through inlet 134. Inlet 134 and outlet 132 may optionally be configured as a single structure (not shown) configured for serving both as a gas outlet (as described herein) and as an inlet (as described herein).

Optionally and preferably, the electrochemical reaction at electrode 116 and/or 118 is monitored, for example, by means of one or more electrochemical unit (not shown) in communication with the electrochemical cell, and which is optionally located in container 20. The electrochemical unit can be configured to measure any parameter pertaining to the operation and/or state of system 100. These include, without limitation, electric potential at electrode 116 and/or 118, pH of solution 40, gas pressure and/or composition (e.g., in container 20), and the like. Electrical signals generated by the electrochemical unit can be transmitted, e.g., via a communication line (not shown) to a remote location (not shown).

In some embodiments, a system for producing hydrogen gas, as described herein, further comprises one or more chambers (not shown) for a solution 140, which is operatively connectable (optionally connected) to container 120 and is configured to provide the solution (optionally via inlet 134) to the electrodes therein, and/or to receive the solution from container 120 (e.g., for removing the solution from the container). In some exemplary embodiments, the system includes two chambers configured to provide (and optionally also receive) solution 140 (optionally via inlet 134) at different temperatures to container 120, for example, wherein one chamber is configured for providing solution at ambient temperature, and another chamber is configured for providing solution at an elevated temperature. A chamber configured for optionally providing solution at a particular temperature may optionally comprise a heating and/or cooling apparatus (not shown), e.g., a heat source and/or heat sink, configured for heating and/or cooling the solution.

The nature and characteristics of the electrodes 116 and/or 118, and solution 140, as well as of other components that can be included in the system, are further detailed herein.

The distances between electrodes 116 and/or 118, container walls, and other components, and the shapes of the various components, can be manipulated and are generally as would be recognized by a person skilled in the art. For example, the redox-active electrodes in each container are preferably placed in close proximity to the working electrode in the respective container in order to minimize ohmic and/or concentration polarization losses. Moreover, the active area of the redox-active electrodes are preferably large enough to match an external current between the working electrode and redox-active electrode in order to minimize kinetic overpotential which would have to be compensated for by increasing the applied voltage.

System 100 may optionally be connectable (and optionally connected) to another system 100 as described herein, so as to form a system such as depicted in FIG. 1 herein.

In preferred embodiments, system 100 comprises no more than one electrochemical cell comprising a redox-active electrode as described herein, and is not connected to another system 100 comprising such an electrochemical cell.

In some embodiments, system 100 comprises at least one of a gas outlet and/or an inlet described herein, and or the system is non-partitioned as described herein.

According to an aspect of some embodiments of the invention, there is provided a method for generating hydrogen gas from an aqueous solution. The method comprises applying a voltage (referred to herein as the "first voltage") between a working electrode and a redox-active electrode of an electrochemical cell.

The method preferably comprises effecting (e.g., upon application of a suitable first voltage), and optionally concomitantly effecting:

reduction of water in an aqueous solution in the electrochemical cell at the working electrode, to thereby generate hydrogen gas and hydroxide ions; and oxidation in the presence of hydroxide ions of the redox-active electrode (optionally comprising consuming hydroxide ions).

By effecting the abovementioned steps, a current may optionally flow between the working electrode and the redox-active electrode so as to complete a circuit, for example, by transfer of negatively charged hydroxide ions from the working electrode (where they are generated) to the redox-active electrode (where they are optionally consumed upon oxidation of the electrode).

In some embodiments of any of the embodiments according to this aspect, a suitable first voltage is at least 0.05 V. In some embodiments, the first voltage is in a range of from 0.05 to 2.2 V. In some embodiments, the first voltage is in a range of from 0.05 to 2.0 V. In some embodiments, the first voltage is in a range of from 0.05 to 1.8 V. In some embodiments, the first voltage is in a range of from 0.05 to 1.7 V. In some embodiments, the first voltage is in a range of from 0.05 to 1.6 V. In some embodiments, the first voltage is in a range of from 0.05 to 1.5 V.

In some embodiments, the first voltage is at least 0.1 V. In some embodiments, the first voltage is in a range of from 0.1 to 2.2 V. In some embodiments, the first voltage is in a range of from 0.1 to 2.0 V. In some embodiments, the first voltage is in a range of from 0.1 to 1.8 V. In some embodiments, the first voltage is in a range of from 0.1 to 1.7 V. In some embodiments, the first voltage is in a range of from 0.1 to 1.6 V. In some embodiments, the first voltage is in a range of from 0.1 to 1.5 V. In some embodiments, the first voltage is in a range of from 0.1 to 1.4 V.

In some embodiments, the first voltage is at least 0.15 V. In some embodiments, the first voltage is in a range of from 0.15 to 2.2 V. In some embodiments, the first voltage is in a range of from 0.15 to 2.0 V. In some embodiments, the first voltage is in a range of from 0.15 to 1.8 V. In some embodiments, the first voltage is in a range of from 0.15 to 1.7 V. In some embodiments, the first voltage is in a range of from 0.15 to 1.6 V. In some embodiments, the first voltage is in a range of from 0.15 to 1.5 V. In some embodiments, the first voltage is in a range of from 0.15 to 1.4 V.

In some embodiments, the first voltage is at least 0.2 V. In some embodiments, the first voltage is in a range of from 0.2 to 2.2 V. In some embodiments, the first voltage is in a range of from 0.2 to 2.0 V. In some embodiments, the first voltage is in a range of from 0.2 to 1.8 V. In some embodiments, the first voltage is in a range of from 0.2 to 1.7 V. In some embodiments, the first voltage is in a range of from 0.2 to 1.6 V. In some embodiments, the first voltage is in a range of from 0.2 to 1.5 V. In some embodiments, the first voltage is in a range of from 0.2 to 1.4 V.

In some embodiments, the first voltage is at least 0.8 V. In some embodiments, the first voltage is in a range of from 0.8 to 2.2 V. In some embodiments, the first voltage is in a range of from 0.8 to 2.0 V. In some embodiments, the first voltage is in a range of from 0.8 to 1.8 V. In some embodiments, the first voltage is in a range of from 0.8 to 1.7 V. In some embodiments, the first voltage is in a range of from 0.8 to 1.6 V. In some embodiments, the first voltage is in a range of from 0.8 to 1.5 V. In some embodiments, the first voltage is in a range of from 0.8 to 1.4 V.

In some embodiments, the first voltage is at least 1.23 V. In some embodiments, the first voltage is in a range of from 1.23 to 2.2 V. In some embodiments, the first voltage is in a range of from 1.23 to 2.0 V. In some embodiments, the first voltage is in a range of from 1.23 to 1.8 V. In some embodiments, the first voltage is in a range of from 1.23 to 1.7 V. In some embodiments, the first voltage is in a range of from 1.23 to 1.6 V. In some embodiments, the first voltage is in a range of from 1.23 to 1.5 V. In some embodiments, the first voltage is in a range of from 1.23 to 1.4 V.

In some embodiments of any of the embodiments according to this aspect, the first voltage is greater than or equal to about the difference between the redox potential associated with reduction of hydrogen ions to hydrogen gas (e.g., 0 $V_{RHE}$) and the redox potential associated with oxidation of the redox-active electrode (e.g., a standard redox potential associated with a redox-active electrode according to any of the respective embodiments described herein).

A suitable first voltage may depend on the specific conditions such as the particular working electrode and/or redox-active electrode used, and the overpotentials associated with electrolysis of water (e.g., with reduction of water to generate hydrogen) and oxidation and/or reduction of the redox-active electrode under such conditions (e.g., overpotentials associated with such electrodes). Determining a suitable voltage for any given conditions will be well within the capabilities of the skilled person.

In some embodiments of any of the embodiments according to this aspect, the electrochemical cell is comprised by a system (e.g., a system according to any of the aspects described herein relating to a system with a first electrochemical and a second electrochemical cell).

In some embodiments of any of the embodiments according to this aspect, the electrochemical cell comprises a container, the working electrode and the redox-active electrode being in the first container, and the container having therein an aqueous solution.

In some embodiments of any of the embodiments according to this aspect, the redox-active electrode is capable of reversibly undergoing oxidation and reduction (as defined herein), e.g., according to any of the embodiments described herein relating to reversible oxidation and reduction. Oxidation may comprise, for example, donating one or more electrons to an electric current and/or consumption of an oxidized species (e.g., molecular oxygen). Similarly, reduction may comprise, for example, accepting one or more electrons from an electric current and/or release of an oxidized species (e.g., molecular oxygen).

In some embodiments of any of the embodiments according to this aspect, reduction of the redox-active electrode is in response to a stimulation (e.g., electric and/or thermal stimulation) described herein.

In some embodiments of any of the embodiments according to this aspect, the reversible oxidation of a redox-active electrode comprises oxidation in the presence of hydroxide ions (optionally comprising consuming hydroxide ions) and the reversible reduction of a redox-active electrode comprises reduction in the presence of water (optionally comprising consuming water molecules). In some embodiments, the oxidation and reduction reactions are mirror images of one another, for example, wherein oxidation consumes hydroxide ion and generates water (e.g., upon donation of at least one electron), and reduction consumes water and generates hydroxide ion (e.g., upon acceptance of at least one electron). In some embodiments, the oxidation and reduction reactions are not mirror images of one another, for example, wherein oxidation consumes hydroxide ion and generates water (e.g., upon donation of at least one electron) and reduction consumes water and generates molecular oxygen (e.g., without donating or accepting an electron).

In some embodiments of any of the embodiments according to this aspect, the method further comprises collecting at least a portion of the generated hydrogen gas (e.g., from a container of the electrochemical cell).

Upon oxidation of the redox-active electrode, depletion of reduced material in the redox-active electrode capable of being oxidized may eventually pose an obstacle to further hydrogen gas generation.

In some embodiments of any of the embodiments according to this aspect, the method further comprises (subsequent to application of the voltage described hereinabove) replenishing the redox-active electrode (as defined herein) with reduced material capable of being oxidized, and/or replacing the redox-active electrode with another redox-active electrode which comprises reduced material capable of being oxidized, to thereby allow further hydrogen gas generation.

In some embodiments of any of the embodiments according to this aspect, the method further comprises (subsequent to application of the voltage described hereinabove) stimulating the redox-active electrode to effect reduction of the redox-active electrode. In some embodiments, the reduction results in generation of oxygen gas. In some such embodiments, the method further comprises collecting at least a portion of the oxygen gas from the first electrochemical cell.

The reduction of the redox-active electrode may optionally be effected by any suitable stimulation, including, for example, electric stimulation (e.g., application of a suitable voltage) and/or thermal stimulation (i.e., a change in temperature), optionally according to any of the respective embodiments described herein.

In some embodiments of any of the embodiments relating to a stimulation which effects reduction, the stimulating comprises heating, for example, heating of at least a portion of the redox-active electrode. In some embodiments, heating is effected by heating an aqueous solution (e.g., prior to, concomitantly with and/or subsequently to placing the solution in the electrochemical cell), which may optionally result in heating of the redox-active electrode upon contact of the electrode with the heated aqueous solution.

In some embodiments, upon effecting reduction of the redox-active electrode by stimulation (e.g., thermal stimulation) according to any of the respective embodiments described herein, a first voltage according to any of the respective embodiments described herein may optionally then be applied, to thereby generate further hydrogen gas. In some embodiments, cycles of stimulation followed by application of a first voltage may be repeated at least once, and optionally any number of times, for example, at least 5 times, at least at least 10 times, at least 30 times, at least 100 times, at least 300 times, and optionally at least 1,000 times. In each cycle of the method according to such embodiments, hydrogen gas may optionally be collected from the electrochemical cell during and/or subsequent to application of the first voltage, and oxygen gas may optionally be collected from the electrochemical cell during and/or subsequent to stimulation.

In some embodiments of any of the embodiments relating to a stimulation which effects reduction, the stimulating is an electric stimulation, and in some embodiments, the electric stimulation comprises applying a second voltage (e.g., between the working electrode and the redox-active electrode), the second voltage having an opposite polarity with respect to the first voltage (e.g., such that current induced by the second voltage is in the opposite direction as current induced by the first voltage).

The second voltage may optionally be applied so as to effect replenishing of the redox-active electrode, e.g., for a time period suitable for replenishing the redox-active electrode.

In some embodiments of any of the embodiments according to this aspect, the second voltage is sufficient to effect reduction of the redox-active electrode (e.g., in the presence of water) to thereby generate hydroxide ions at the redox-active electrode, according to any of the respective embodiments described herein.

In some embodiments of any of the embodiments according to this aspect, the second voltage is sufficient to concomitantly effect oxidation of hydroxide ions to thereby generate oxygen gas and water (e.g., at the working electrode) and reduction of the redox-active electrode (e.g., in the presence of water), according to any of the respective embodiments described herein (e.g., to thereby by generate hydroxide ions at the redox-active electrode). In some such embodiments, the method further comprises collecting oxygen gas (e.g., oxygen gas generated at the working electrode) from the first electrochemical cell, e.g., subsequently to and/or concomitantly with application of the second voltage.

In some embodiments of any of the embodiments according to this aspect, a sum (of the absolute values) of the first voltage and the second voltage is at least 1.5 V, optionally at least 1.6 V, optionally at least 1.7 V and optionally at least 1.8 V.

By applying a second voltage according to some of the embodiments herein, a redox-active electrode replenished with reduced material capable of being oxidized may optionally be provided, optionally while generating (and optionally collecting) oxygen gas.

In some embodiments, subsequent to application of the second voltage, a first voltage according to any of the respective embodiments described herein may optionally then be applied, to thereby generate further hydrogen gas. In some embodiments, cycles of application of the first voltage followed by application of the second voltage may be repeated at least once, and optionally any number of times, for example, at least 5 times, at least at least 10 times, at least 30 times, at least 100 times, at least 300 times, and optionally at least 1,000 times.

In some embodiments of any of the embodiments according to this aspect, the system comprises no more than one electrochemical cell comprising a redox-active electrode as described herein.

In some alternative embodiments of any of the embodiments according to this aspect, two electrochemical cells as described herein may optionally be electrically connected, such that the redox-active electrodes of each electrochemical cell are connected to one another. Upon application of a suitable voltage across the two connected electrochemical cells (i.e., between the working electrode of one cell and the working electrode of the other), the voltage can concomitantly serve as first voltage with respect to one cell (according to any of the respective embodiments described herein) and as a second voltage with respect to the other cell (according to any of the respective embodiments described herein). The polarity of the voltage may then be reversed any number of times. Such configurations of cells are described in more detail in the section herein relating to separate compartments.

In some embodiments of any of the embodiments according to this aspect, gas is evacuated from the electrochemical cell between application of the first voltage and the stimulation described herein (e.g., subsequent to application of the first voltage and prior to application of the stimulation and/or vice versa), for example, in order to minimize contamination of hydrogen gas generated upon application of the first voltage with oxygen gas upon stimulation (and/or contamination of the oxygen gas with the hydrogen gas).

In some embodiments of any of the embodiments according to this aspect, application of a first voltage and/or a second voltage according to any of the respective embodiments described herein is effected until a potential difference between the working electrode and redox-active electrode reaches a pre-determined limit (e.g., about 2.5 V, about 2.75 V, about 3 V, about 3.25 V) at a pre-determined current (e.g., when the process is performed amperometrically) and/or when the ratio to potential difference to current reaches a pre-determined limit.

In some embodiments of any of the embodiments according to this aspect, application of a first voltage and/or a second voltage according to any of the respective embodiments described herein is effected until a current between the working electrode and redox-active electrode drop to a pre-determined limit (e.g., about 2.5 V, about 2.75 V, about 3 V, about 3.25 V) at a pre-determined voltage (e.g., when the process is performed potentiometrically), optionally at a constant first voltage and/or a second voltage described herein.

In some embodiments of any of the embodiments according to this aspect, the oxidation and/or reduction of a redox-active electrode according to any of the respective embodiments described herein is characterized by a standard redox potential in a range of from 0 to 1.6 $V_{RHE}$. In some such embodiments, the standard redox potential in a range of from 0.05 to 1.55 $V_{RHE}$. In some embodiments, the standard redox potential in a range of from 0.1 to 1.5 $V_{RHE}$. In some embodiments, the standard redox potential in a range of from 0.15 to 1.45 $V_{RHE}$. In some embodiments, the standard redox potential in a range of from 0.2 to 1.4 $V_{RHE}$.

In some embodiments of any of the embodiments according to this aspect, a redox-active electrode according to any of the respective embodiments described herein is characterized by a standard redox potential in a range of from 0 to 1.5 $V_{RHE}$. In some such embodiments, the standard redox potential in a range of from 0.05 to 1.45 $V_{RHE}$. In some embodiments, the standard redox potential in a range of from 0.1 to 1.4 $V_{RHE}$. In some embodiments, the standard redox potential in a range of from 0.15 to 1.35 $V_{RHE}$. In some embodiments, the standard redox potential in a range of from 0.2 to 1.3 $V_{RHE}$.

In some embodiments of any of the embodiments according to this aspect, a redox-active electrode according to any of the respective embodiments described herein is characterized by a standard redox potential in a range of from 0 to 0.8 $V_{RHE}$. In some such embodiments, the standard redox potential in a range of from 0.05 to 0.8 $V_{RHE}$. In some embodiments, the standard redox potential in a range of from 0.1 to 0.8 $V_{RHE}$. In some embodiments, the standard redox potential in a range of from 0.15 to 0.8 $V_{RHE}$. In some embodiments, the standard redox potential in a range of from 0.2 to 0.8 $V_{RHE}$.

In some embodiments of any of the embodiments according to this aspect, a redox-active electrode according to any of the respective embodiments described herein is characterized by a standard redox potential in a range of from 0.8 to 1.6 $V_{RHE}$. In some such embodiments, the standard redox potential in a range of from 0.8 to 1.55 $V_{RHE}$. In some embodiments, the standard redox potential in a range of from 0.8 to 1.5 $V_{RHE}$. In some embodiments, the standard redox potential in a range of from 0.8 to 1.45 $V_{RHE}$. In some embodiments, the standard redox potential in a range of from 0.8 to 1.4 $V_{RHE}$.

In some embodiments of any of the embodiments according to this aspect, a redox-active electrode according to any of the respective embodiments described herein is characterized by a standard redox potential of at least 1.23 $V_{RHE}$. In some such embodiments, the standard redox potential in a range of from 1.23 to 1.6 $V_{RHE}$. In some embodiments, the standard redox potential in a range of from 1.23 to 1.55 $V_{RHE}$. In some embodiments, the standard redox potential in a range of from 1.23 to 1.5 $V_{RHE}$. In some embodiments, the standard redox potential in a range of from 1.23 to 1.45 $V_{RHE}$. In some embodiments, the standard redox potential in a range of from 1.23 to 1.4 $V_{RHE}$. In some embodiments, the standard redox potential in a range of from 1.23 to 1.35 $V_{RHE}$. In some embodiments, the standard redox potential in a range of from 1.23 to 1.3 $V_{RHE}$.

In some embodiments of any of the embodiments according to this aspect, a redox-active electrode according to any of the respective embodiments described herein is characterized by a standard redox potential of at least 1.28 $V_{RHE}$. In some such embodiments, the standard redox potential in a range of from 1.28 to 1.6 $V_{RHE}$. In some embodiments, the standard redox potential in a range of from 1.28 to 1.55 $V_{RHE}$. In some embodiments, the standard redox potential in a range of from 1.28 to 1.5 $V_{RHE}$. In some embodiments, the standard redox potential in a range of from 1.28 to 1.45 $V_{RHE}$. In some embodiments, the standard redox potential in a range of from 1.28 to 1.4 $V_{RHE}$. In some embodiments, the standard redox potential in a range of from 1.28 to 1.35 $V_{RHE}$. In some embodiments, the standard redox potential in a range of from 1.28 to 1.3 $V_{RHE}$.

In some embodiments of any of the embodiments according to this aspect, a redox-active electrode according to any of the respective embodiments described herein is characterized by a standard redox potential of at least 1.33 $V_{RHE}$. In some such embodiments, the standard redox potential in a range of from 1.33 to 1.6 $V_{RHE}$. In some embodiments, the standard redox potential in a range of from 1.33 to 1.55 $V_{RHE}$. In some embodiments, the standard redox potential in a range of from 1.33 to 1.5 $V_{RHE}$. In some embodiments, the standard redox potential in a range of from 1.33 to 1.45 $V_{RHE}$. In some embodiments, the standard redox potential in a range of from 1.33 to 1.4 $V_{RHE}$. In some embodiments, the standard redox potential in a range of from 1.33 to 1.35 $V_{RHE}$.

In some embodiments of any of the embodiments according to this aspect, a redox-active electrode according to any of the respective embodiments described herein is characterized by a standard redox potential of at least 1.38 $V_{RHE}$. In some such embodiments, the standard redox potential in a range of from 1.38 to 1.6 $V_{RHE}$. In some embodiments, the standard redox potential in a range of from 1.38 to 1.55 $V_{RHE}$. In some embodiments, the standard redox potential in a range of from 1.38 to 1.5 $V_{RHE}$. In some embodiments, the standard redox potential in a range of from 1.38 to 1.45 $V_{RHE}$. In some embodiments, the standard redox potential in a range of from 1.38 to 1.4 $V_{RHE}$.

In some embodiments of any of the embodiments according to this aspect, a redox-active electrode according to any of the respective embodiments described herein is characterized by a standard redox potential of at least 1.43 $V_{RHE}$. In some such embodiments, the standard redox potential in a range of from 1.43 to 1.6 $V_{RHE}$. In some embodiments, the standard redox potential in a range of from 1.43 to 1.55 $V_{RHE}$. In some embodiments, the standard redox potential in a range of from 1.43 to 1.5 $V_{RHE}$. In some embodiments, the standard redox potential in a range of from 1.43 to 1.45 $V_{RHE}$.

Without being bound by any particular theory, it is believed that a standard redox potential of at least 1.23 $V_{RHE}$, for example in a range of from 1.23 to 1.6 $V_{RHE}$, in a redox-active electrode (e.g., in combination with application of a first voltage of at least 1.23 V), according to any of the respective embodiments described herein, is suitable for embodiments wherein reduction of the redox-active electrode is effected by production of molecular oxygen (e.g., rather than by application of a second voltage), as concomitant reduction of the electrode (characterized by the abovementioned redox potential) and reaction of water to form molecular oxygen (characterized by standard redox potential of at least 1.23 $V_{RHE}$) may be effected without requiring application of energy to the system, and may optionally be exothermic. It is further believed that relative stability of the oxidized state may be associated with a relatively small difference between the redox potential and 1.23 $V_{RHE}$ (e.g., in accordance with a redox potential range described herein).

It is further believed that a standard redox potential in a range of from 0 to 1.6 $V_{RHE}$ in a redox-active electrode (e.g., in combination with application of a first voltage in a range of from 0.05 to 2.0 V), according to any of the respective embodiments described herein, may be suitable for embodiments wherein a first voltage and a second voltage are applied (e.g., according to any of the respective embodiments described herein).

In some embodiments of any of the embodiments according to this aspect, a capacity of the redox-active electrode to reversibly undergo oxidation and reduction (e.g., a charging capacity) is in accordance with any of the embodiments described herein relating to capacity of a redox-active electrode.

In some embodiments of any of the embodiments according to this aspect, a redox-active electrode according to any of the respective embodiments described herein comprises a substance which reversibly undergoes oxidation and reduction. In some embodiments, such a substance comprises a transition metal (optionally Ni, Cu, Zn and/or Cd) and/or a metal from the p-block elements (optionally Pb and/or Sn).

In some embodiments of any of the embodiments according to this aspect, a redox-active electrode according to any of the respective embodiments described herein comprises a matrix material which includes an electrical conductor (an electrically conductive material), according to any of the embodiments described herein relating to such a matrix.

In some embodiments of any of the embodiments according to this aspect, activation cycles of charge-discharge are performed (according to any of the respective embodiments described herein) on the redox-active electrode prior to using the redox-active electrode(s) in a method and/or system described herein.

In some embodiments of any of the embodiments according to this aspect, the redox-active electrode comprises nickel, for example, in a form of Ni(OH)$_2$ and/or a nickel oxyhydroxide, according to any of the respective embodiments described herein relating to nickel in a redox-active electrode.

A reversible oxidation of Ni(OH)$_2$ at the redox-active electrode may optionally be represented by the formula:

$$2Ni(OH)_2 + 2OH^- \rightarrow 2NiOOH + 2e^-$$

The hydroxide ion consumed by such a reaction may be, for example, hydroxide ion produced at the working electrode.

A reversible reduction of NiOOH at the redox-active electrode may optionally be represented by the formula:

$$2NiOOH + 2e^- \rightarrow 2Ni(OH)_2 + 2OH^-$$

The hydroxide ion produced by such a reaction may, for example, be oxidized at the working electrode.

Alternatively or additionally, a reversible reduction of NiOOH at the redox-active electrode (e.g., a reduction stimulated upon a thermal stimulation) may optionally be represented by the formula:

$$4NiOOH + 2H_2O \rightarrow 4Ni(OH)_2 + O_2$$

In some embodiments of any of the embodiments according to this aspect, the working electrode is composed of any material suitable for a cathode at which a hydrogen evolution reaction occurs (e.g., according to any of the respective embodiments relating to a first working electrode described herein).

Figure 20A:
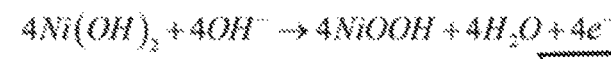
FIGS. 20A and 20B present a schematic illustration of a bimodal 1-cell system with OH$^-$ as an electrolyte according to some embodiments of the present invention, with H$_2$ generation at a HER electrode and oxidation of Ni(OH)$_2$ to NiOOH at a second electrode during a hydrogen-generating mode (FIG. 20A), and with reaction of NiOOH with water at the second electrode to generate O$_2$ and regenerate Ni(OH)$_2$ during an oxygen-generating mode (FIG. 20B).
Figure 20A:
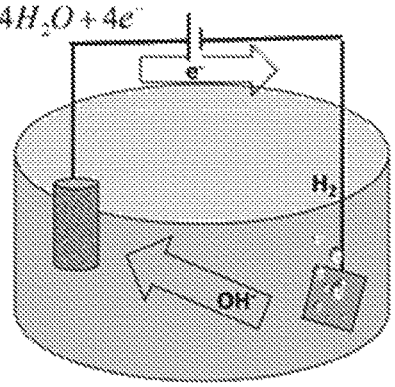
Figure 20A:
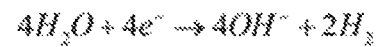

A system comprising Ni(OH)$_2$/NiOOH-based redox-active electrodes according to some embodiments of the invention and oxidation and reduction reactions thereof is depicted in FIG. 20A (depicting oxidation of redox-active electrode) and 20B (depicting reduction of redox-active electrode).

In some embodiments of any of the embodiments according to this aspect, the working electrode is composed of any material suitable for a cathode at which a hydrogen evolution reaction occurs and/or for an anode at which an oxygen evolution reaction occurs (e.g., under alkaline conditions), e.g., according to any of the respective embodiments relating to a first working electrode described herein. Such a working electrode may be used, for example, in embodiments wherein an oxygen evolution reaction is effected at the working electrode upon application of a second voltage according to any of the respective embodiments described herein.

In some embodiments of any of the embodiments according to this aspect, the working electrode comprises carbon, one or more photoactive material (e.g., photocathode material), and/or one or more metals, (e.g., according to any of the respective embodiments relating to a first working electrode described herein) and optionally at least one additional substance which acts as a catalyst of a cathodic and/or anodic reaction (e.g., according to any of the respective embodiments described herein).

In some embodiments of any of the embodiments relating to a working electrode comprising a photocathode material, oxygen generation is not effected at the working electrode, but rather at the redox-active electrode (e.g., upon thermal stimulation).

In some embodiments of any of the embodiments according to this aspect, the working electrode is characterized by an OER (oxygen evolution reaction) kinetic potential (as defined herein) of no more than 2.0 $V_{RHE}$. In some embodiments, the OER kinetic potential is no more than 1.9 $V_{RHE}$. In some embodiments, the OER kinetic potential is no more than 1.8 $V_{RHE}$. In some embodiments, the OER kinetic potential is no more than 1.7 $V_{RHE}$. In some embodiments, the OER kinetic potential is no more than 1.6 $V_{RHE}$. In some embodiments, the OER kinetic potential is no more than 1.55 $V_{RHE}$. In some embodiments, the OER kinetic potential is no more than 1.5 $V_{RHE}$. In some embodiments, the OER kinetic potential is no more than 1.45 $V_{RHE}$. In some embodiments, the OER kinetic potential is no more than 1.4

$V_{RHE}$. In some embodiments, the OER kinetic potential is no more than 1.35 $V_{RHE}$. In some of the aforementioned embodiments, an OER is effected at the working electrode.

In some embodiments of any of the embodiments described herein, the redox-active electrode is characterized by an OER (oxygen evolution reaction) kinetic potential which is at least 0.05 V higher than a redox potential (e.g., standard redox potential) associated with a reversible oxidation of the redox-active electrode. In some embodiments, the redox-active electrode is characterized by an OER kinetic potential which is at least 0.1 V higher than a redox potential associated with a reversible oxidation of the redox-active electrode. In some embodiments, the redox-active electrode is characterized by an OER kinetic potential which is at least 0.15 V higher than a redox potential associated with a reversible oxidation of the redox-active electrode. In some embodiments, the redox-active electrode is characterized by an OER kinetic potential which is at least 0.2 V higher than a redox potential associated with a reversible oxidation of the redox-active electrode. In some embodiments, the redox-active electrode is characterized by an OER kinetic potential which is at least 0.25 V higher than a redox potential associated with a reversible oxidation of the redox-active electrode. In some embodiments, the redox-active electrode is characterized by an OER kinetic potential which is at least 0.3 V higher than a redox potential associated with a reversible oxidation of the redox-active electrode.

It is expected that during the life of a patent maturing from this application many relevant redox-active electrodes and redox-active materials suitable for inclusion therein, HER electrodes, OER electrodes, and other electrochemical cell components will be developed and the scope of the terms "redox-active electrode", "working electrode" and the like are intended to include all such new technologies a priori.

As used herein the term "about" refers to ±10%, and in some embodiments ±5%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non-limiting fashion.

Example 1

Nickel Hydroxide Electrode Preparation $Ni(OH)_2$ mixture was prepared using 52% by weight $Ni(OH)_2$, 21% by weight graphite and 27% by weight LDPE, according to the optimized ratios [Freitas, M. (2001) Journal of Power Sources, 93(1), pp. 163-173].

Figure 3:
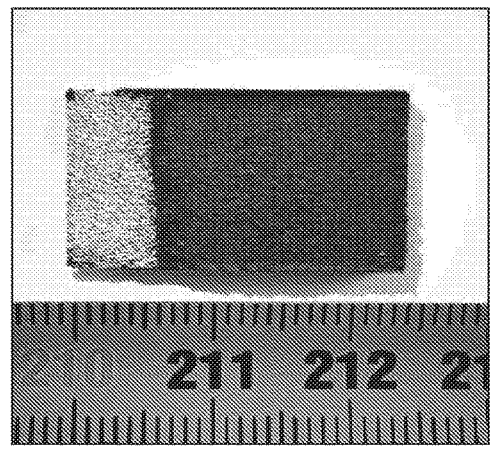
FIG. 3 is an image of a nickel-hydroxide electrode prepared by thermopressing of a powdered mixture of nickel-hydroxide, low density polypropylene (LDPP) and graphite into a nickel foam sheet.

Nickel hydroxide [$Ni(OH)_2$] electrodes, as shown in FIG. 3, were prepared by pasting and thermo-pressing the $Ni(OH)_2$ mixture onto nickel foam, as follows.

Water was added to the dry mixture at a total 25% by weight and the wet mixture was placed on both sides of a pre-cleaned nickel foam of 1.6 mm thickness. The template and paste were dried for 3 hours at room temperature under vacuum. Thereafter the electrode was thermo-pressed at 140° C., 840 kg·cm$^{-2}$ for 7 minutes to a final thickness of 1.6 mm. The overall area of the obtained electrode was 3.75 cm$^2$.

A thermo-resistant tape was used for masking before pasting the mixture and removed at the end of the process, leaving a pure nickel surface in order to connect the electrode to the electric circuit.

A photograph of the obtained electrode is presented in FIG. 3.

Figure 4:
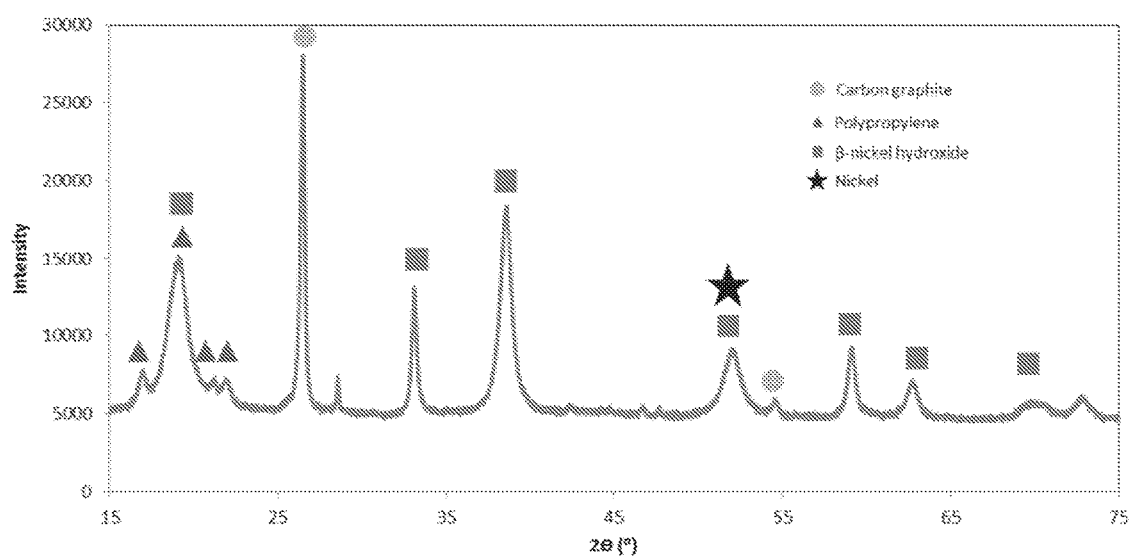
FIG. 4 presents an XRD analysis of the electrode depicted in FIG. 3, showing that the nickel hydroxide is in the $\beta$-Ni(OH)$_2$ phase.

XRD measurements of the prepared electrodes confirmed the presence of a β-$Ni(OH)_2$ powder. An exemplary set of XRD data is presented in FIG. 4.

After thermo-pressing, an external paste layer remained outside of the nickel foam matrix. As a pretreatment, this unstable outer layer was removed mechanically (by scraping). Further self-removal of this layer occurred when the electrode was electrochemically cycled in alkaline solution by applying recurrent positive and negative currents to this electrode. After this pretreatment procedure, the outer layer remained relatively stable.

Example 2

Activation and Electrochemical Conversion of Nickel Hydroxide [Ni(OH)$_2$] to Nickel Oxy-Hydroxide [NiOOH]

As discussed hereinabove, the following general reaction scheme has been proposed for the β-Ni(OH)$_2$ and β-NiOOH redox reactions:

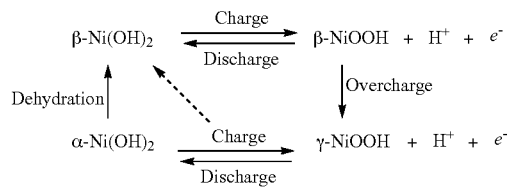

The conversion of β-Ni(OH)$_2$ to β-NiOOH is generally considered reversible. According to IUPAC [IUPAC 'Selected Constants', edited by G. Chariot, Butterworths, London (1971) p. 34], the formal potential $E_0$ for the Ni(OH)$_2$/NiOOH couple is 0.42V vs. Hg/HgO/1M KOH. Other researchers [Barnard et al. (1980) Journal of Applied Electrochemistry, 10(1), pp. 109-125] have found that values of $E_0$ for 'activated' and 'de-activated' β-phase couples are in the range of 0.443-0.470V vs. Hg/HgO/1M KOH, with a dependence on electrolyte concentration.

There are reports in the art that overcharging of β-Ni(OH)$_2$ can lead to the formation of γ-NiOOH from β-NiOOH, with a subsequent deactivation of the electrode. See, for example, Sun et al. (2007) Chinese Journal of Chemical Engineering, 15(2), pp. 262-267; Snook et al. (2007) Journal of power sources, 168(2), pp. 513-521; Oshitani et al. (1986) Journal of Applied Electrochemistry, 16(3), pp. 403-412; and Provazi et al. (2001) Journal of power sources, 102(1), pp. 224-232.

Oshitani et al. (1986) have reported that up until 75% charging capacity, the electrode's thickness decreases with charging, yet, when capacity exceeds 75%, electrode thickness increases and it starts to swell, indicating that the parasitic reaction β-NiOOH→γ-NiOOH begins at approx. 75% charging.

Based on the above reports, the present inventors have assumed that the prepared β-Ni(OH)$_2$ electrodes can be electrochemically cycled between β-Ni(OH)$_2$ and β-NiOOH if γ-NiOOH formation by overcharge is prevented. Therefore, special care was taken to avoid overcharge, and the charging of all electrodes was limited to below 37.5% (0.5×75%) of maximal charging capacity.

Figure 5A:
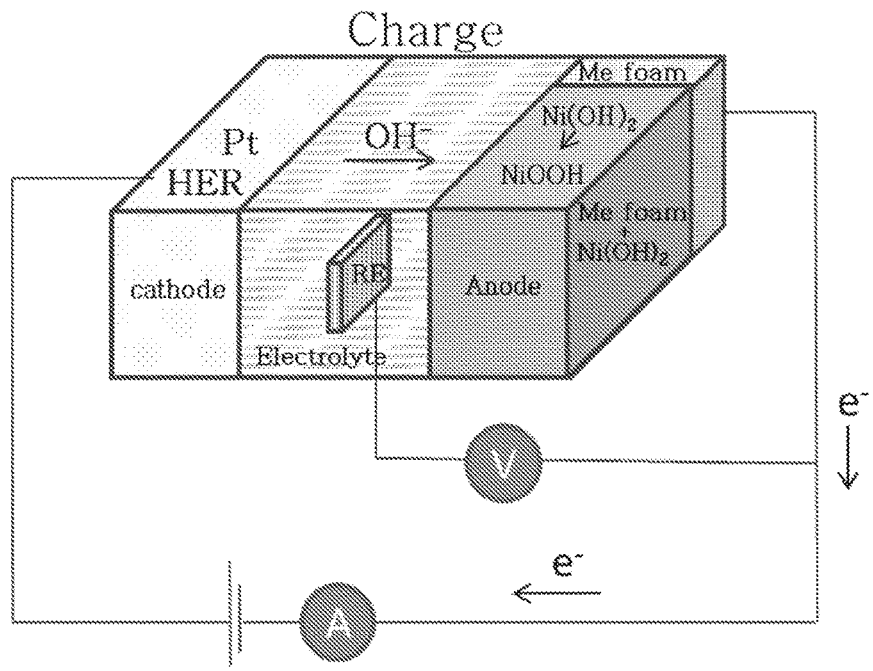
FIGS. 5A-B present schematic illustrations of an exemplary cell in a 3-electrode configuration, according to some embodiments of the present invention, wherein the cell is used to charge a Ni(OH)$_2$ electrode as depicted in FIG. 3 (FIG. 5A), and to discharge a NiOOH electrode (FIG. 5B).
Figure 5B:
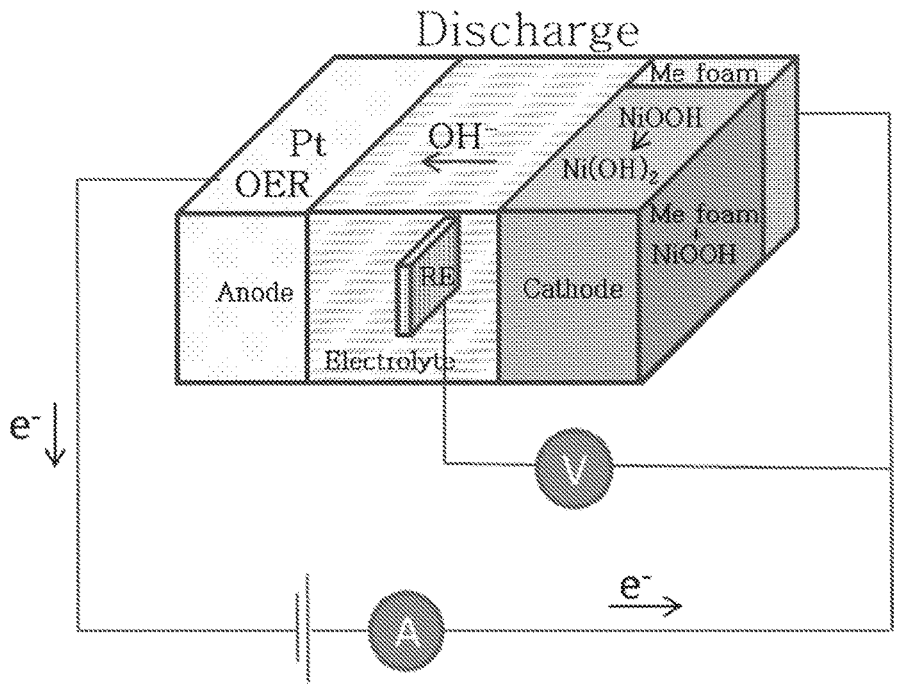

A single cell system was constructed by connecting an Ni(OH)$_2$ electrode as the working electrode (WE) in a 3-electrode cell, using a Pt electrode (Pt sheet 1 cm×1 cm) as the counter electrode and a saturated Ag/AgCl electrode as the reference electrode (RE) in 1M NaOH electrolyte. The Ni(OH)$_2$ electrode was electrochemically cycled between β-Ni(OH)$_2$⇌β-NiOOH. The charge and discharge configurations of the cell are depicted in FIGS. 5A and 5B, respectively.

The electrodes were subjected to a series of short (10 minutes) charge-discharge cycles under a constant current of ±5 mA, which was well within the estimated 37.5% charging capacity. The outer electrode layer was self-removed almost entirely. Thereafter, the electrodes were washed with distilled water, dried under vacuum at 40° C. and weighed, in order to estimate maximum charging capacity per weight of active material.

Assuming charge efficiency of 0.9e$^-$ per Ni atom [Fierro et al., (2001), supra and WO 2000/014818], the maximum charging capacity of an electrode can be calculated as follows:

i.
$$M_{Ni(OH)_2}(g) \cong (M_{electrode}(g) - M_{Ni\ foam}(g)) \times 0.52$$

ii.
$$Q = \frac{M_{Ni(OH)_2}(g)}{92.7\left(\frac{g}{mol}\right)} \times 6.022 \times 10^{23}\left(\frac{molec}{mol}\right) \times 0.9\left(\frac{e}{molec}\right) \times 1.602 \times 10^{-19}\left(\frac{C}{e}\right)$$

iii.
$$Q_{max,theory} = 0.75 \times Q$$

iv.
$$Q_{max,actual} = 0.5 \times Q_{max,theory} = 0.375 \times Q$$

This calculation is based upon the assumption that paste composition within the nickel foam is homogenous.

The maximum charging capacity for two β-Ni(OH)$_2$ electrodes prepared and used as described herein was calculated as 5 (mA)×8.4 (hours) for one electrode and 5 (mA)×6.9 (hours) for the second.

From the minimum value, 37.5% is 5 (mA)×2.5 (hours) and this charging capacity was used for next stages of experiments. Therefore, all following experiments were done at 5 mA, not exceeding 2.5 hours upon charging.

Figure 6:
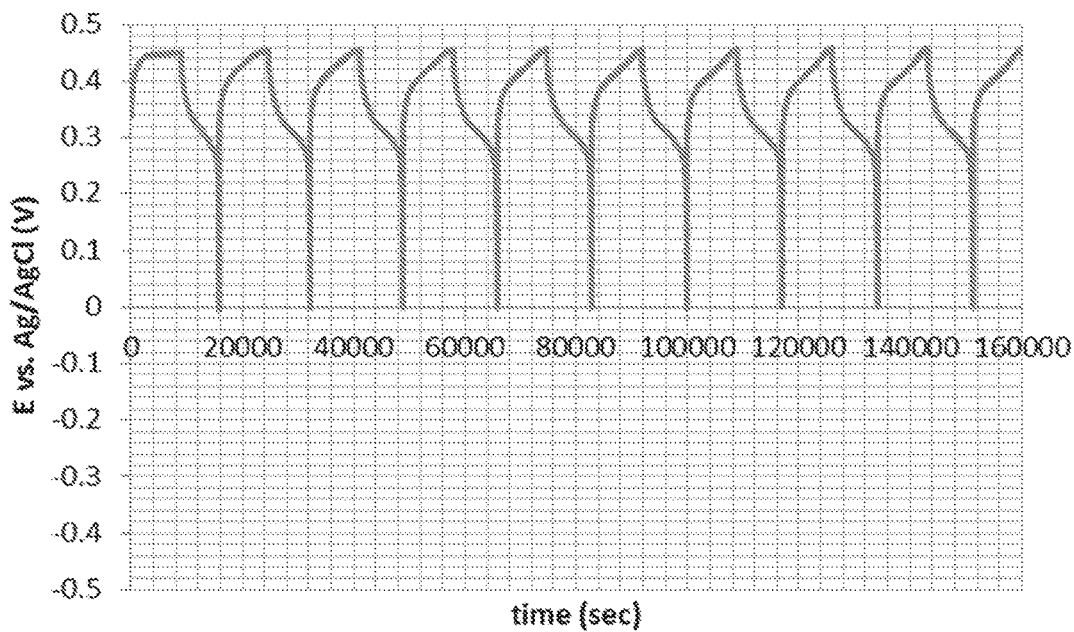
FIG. 6 presents a potential/time plot illustrating the activation phase cycling of a Ni(OH)$_2$/NiOOH electrode in a cell configuration depicted in FIGS. 5A-B.
Figure 7:
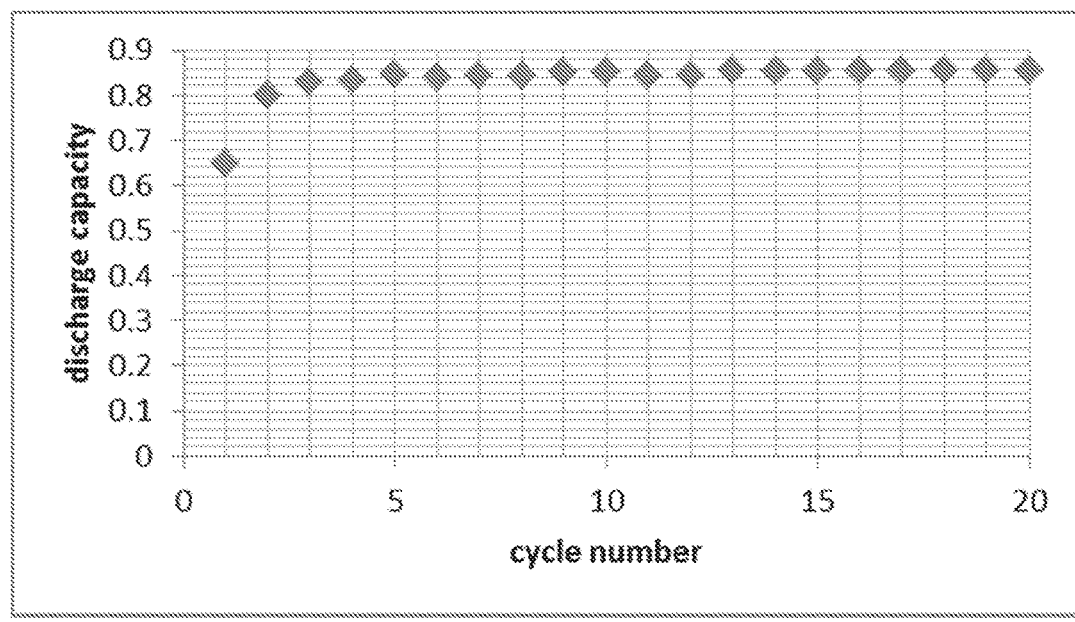
FIG. 7 is a plot illustrating the discharge capacity of the cell configuration depicted in FIGS. 5A-B, with successive activation cycles depicted in FIG. 4.

The β-Ni(OH)$_2$ electrodes in a 3-electrode single cell construction depicted in FIGS. 5A-B, were each subjected to 10 activation cycles in which they were charged at 5 mA for 2.5 hours and then discharged for the same time at reverse current. The obtained data is presented in FIG. 6. As shown in FIG. 7, under these conditions discharge capacity increased with each cycle until it reached a plateau of 85% discharge capacity. The activation stage finished with one electrode at its discharged form, consisting mostly of β-Ni(OH)$_2$, and another electrode at its charged form, consisting of approximately 40% β-NiOOH.

For convenience, charged and discharged electrodes are referred to as 'NiOOH' and 'Ni(OH)$_2$' electrodes, respectively.

Example 3

Two Cell Water Electrolysis

Figure 9A:
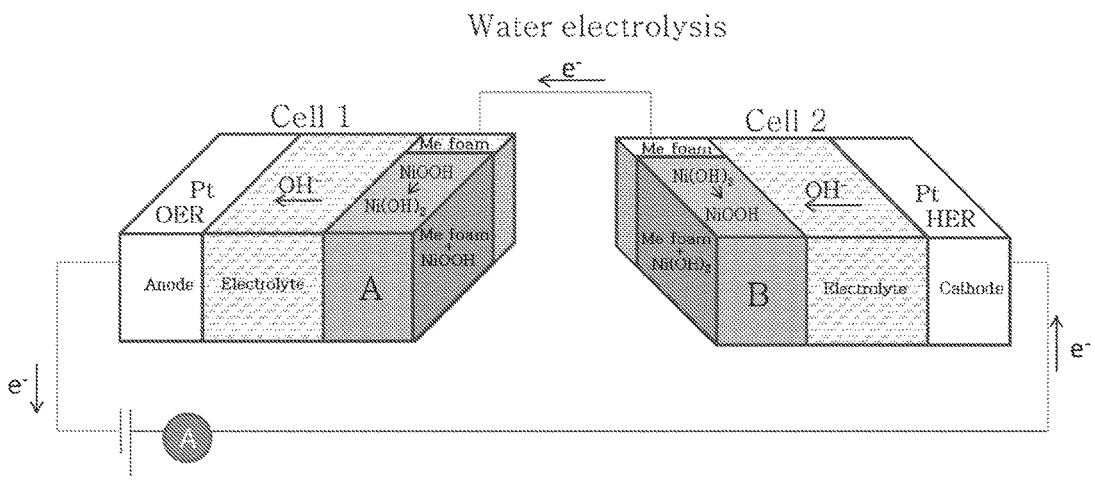

A two-cell system was set up wherein each cell contained one Pt sheet electrode (1 cm×1 cm) and one Ni(OH)$_2$/NiOOH electrode. The Pt electrodes were connected to a "VersaSTAT 3" potentiostat/galvanostat in a two-cell configuration and the Ni(OH)$_2$/NiOOH electrodes were connected to each other via an external metal wire. The electrolyte in the cells was 1M NaOH. The system and its oxidation and reduction reactions are schematically illustrated in FIG. 8. The initial system configuration is schematically illustrated in FIG. 9A. The proposed mechanism is presented by the equations in Scheme 1 hereinabove.

Amperometric measurements were carried out at a current of 5 mA. The initial potential difference (voltage) between the WE and CE was 2V and it increased slowly until a sharp increase in voltage, indicating the complete discharge of the NiOOH electrode. The measurement was stopped when the voltage reached 3V and is referred to herein as 'step 1'.

For the next electrolysis steps, two configurations were tested, as follows.

Figure 9B:
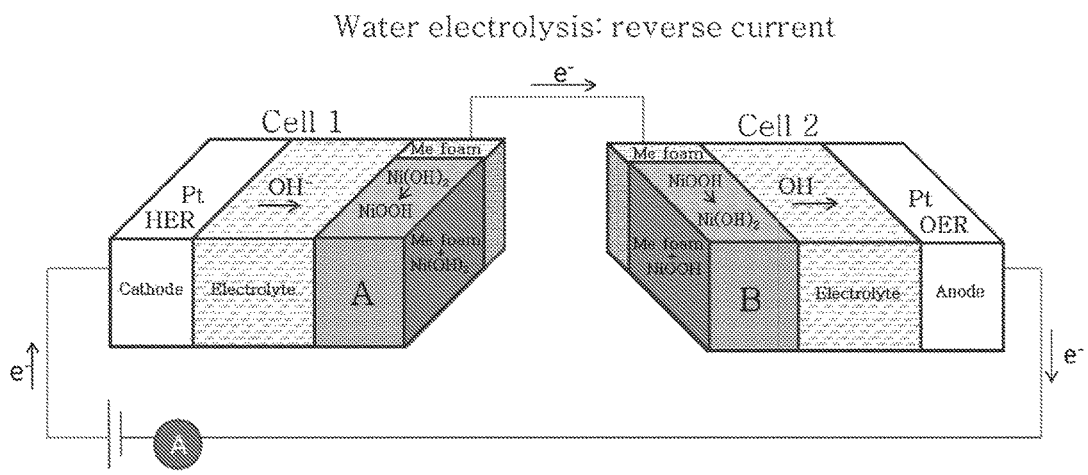
Figure 10:
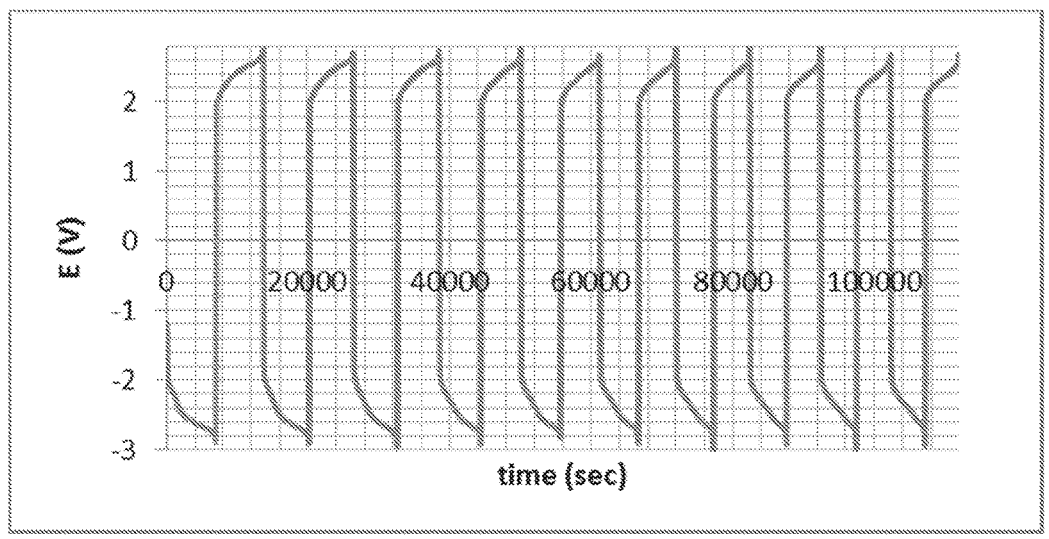
FIG. 10 presents a potential/time plot illustrating the activation phase cycling of a Ni(OH)$_2$/NiOOH electrode in a 2-cell configuration depicted in FIGS. 9A and 9B.

A) Current direction reversal: when the potential difference between the WE and CE reached 3V, the current direction was reversed without changing the position of electrodes, as schematically illustrated in FIG. 9B. Once the current direction was reversed the initial potential difference was −2V and it decreased slowly until a sharp decrease which was stopped at −3V. The Ni(OH)$_2$ and NiOOH electrodes were converted back to their initial composition, constituting a full cycle. When the potential difference reached −3V, the current direction was reversed again, and so forth. Overall 20 successive current reversal steps (10 cycles) were performed, and the recorded voltage as a function of time is presented in FIG. 10.

Figure 11:
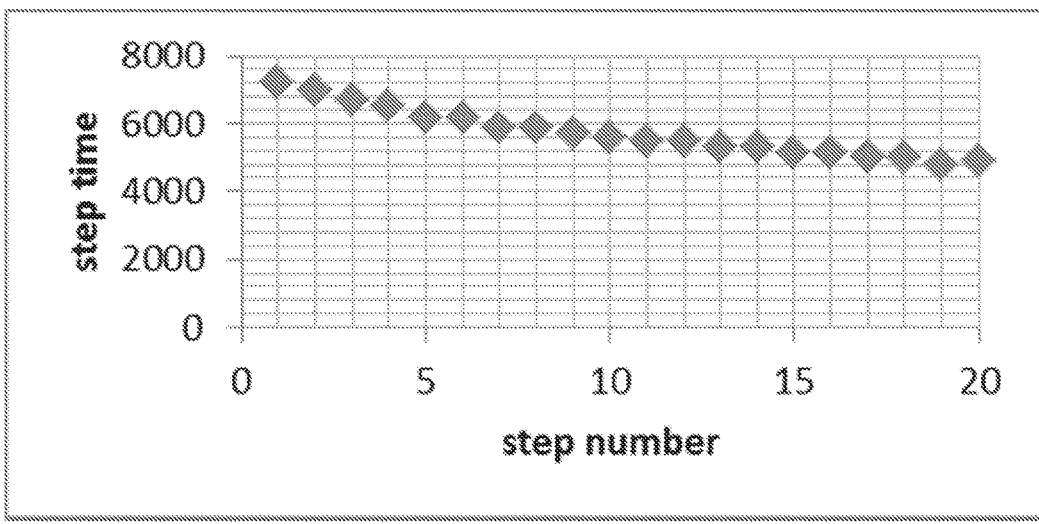
FIG. 11 is a plot illustrating the electrolysis time of each successive step depicted in FIG. 10.

The discharge capacity of each successive step was calculated relative to the charge value introduced at the former step, and the data is presented in FIG. 11. With each successive current reversal step, the discharge capacity decreased by 0-5% relative to the former step. Overall, the discharge capacity decreased by 32% after 10 cycles.

Figure 9C:
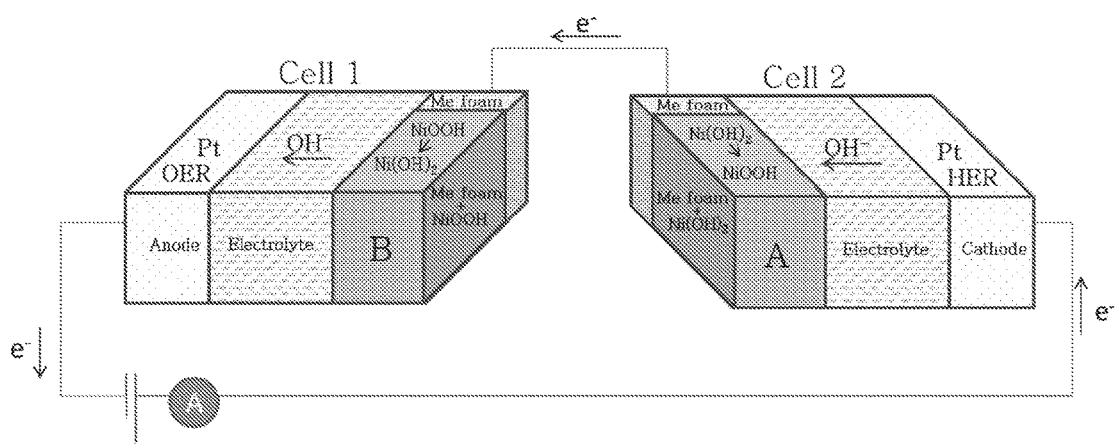
Figure 12:
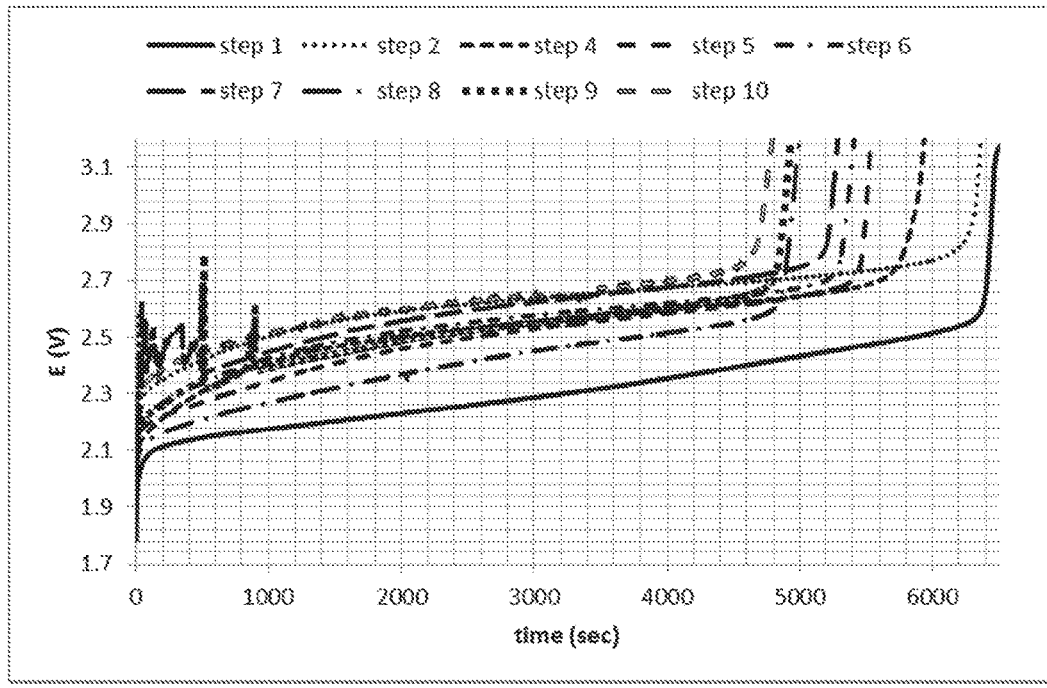
FIG. 12 is a plot illustrating water electrolysis via a 2-cell configuration depicted in FIGS. 9A and 9C.

B) Electrode location reversal: when the potential difference between the WE and CE reached 3V, the location of the Ni(OH)$_2$/NiOOH electrodes was reversed, as schematically illustrated in FIG. 9C. The discharged electrode was placed instead of the charged electrode and vice versa. The same current and current direction was applied and the potential difference was measured until it reached 3V. At this point the electrode location was reversed again. The obtained data is presented in FIG. 12.

Figure 13:
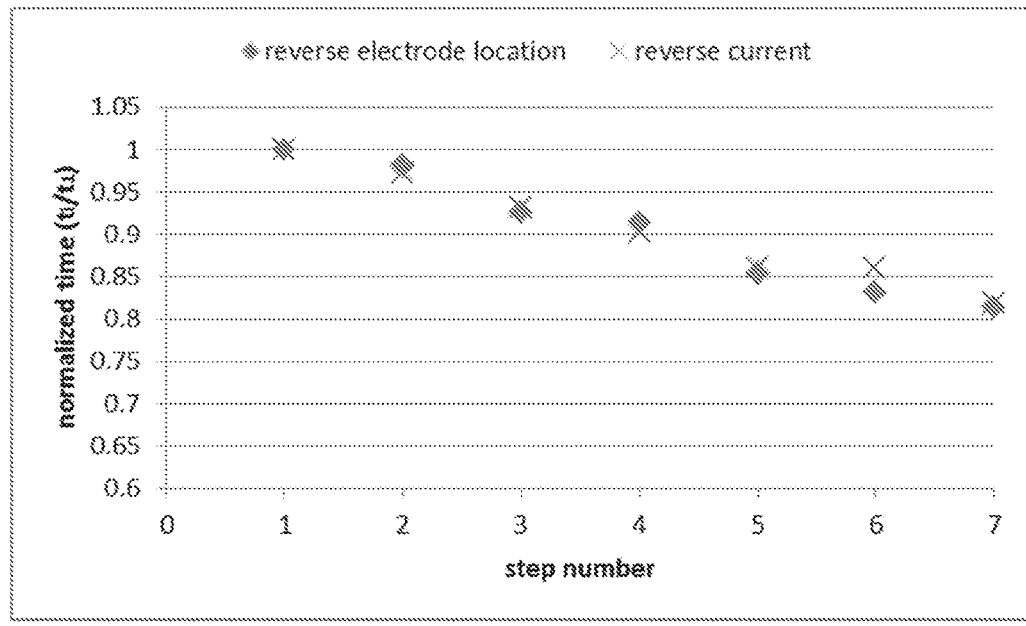
FIG. 13 is a plot illustrating the normalized step time for electrolysis steps for a 2-cell configuration depicted in FIGS. 9A and 9C (where the electrode location was switched between steps) and for a 2-cell configuration depicted in FIGS. 9A and 9B (where the current direction was reversed between steps).

FIG. 13 presents the normalized step time ($t_i/t_1$, i being the step number) for 10 cycles of the two configurations. Results of normalized step time are very similar between the two configurations above mentioned with a maximum error of 6%. Gas bubbles were clearly observed forming on the Pt electrodes and escaping rapidly, indicating the hydrogen and oxygen evolution reactions.

Figure 14:
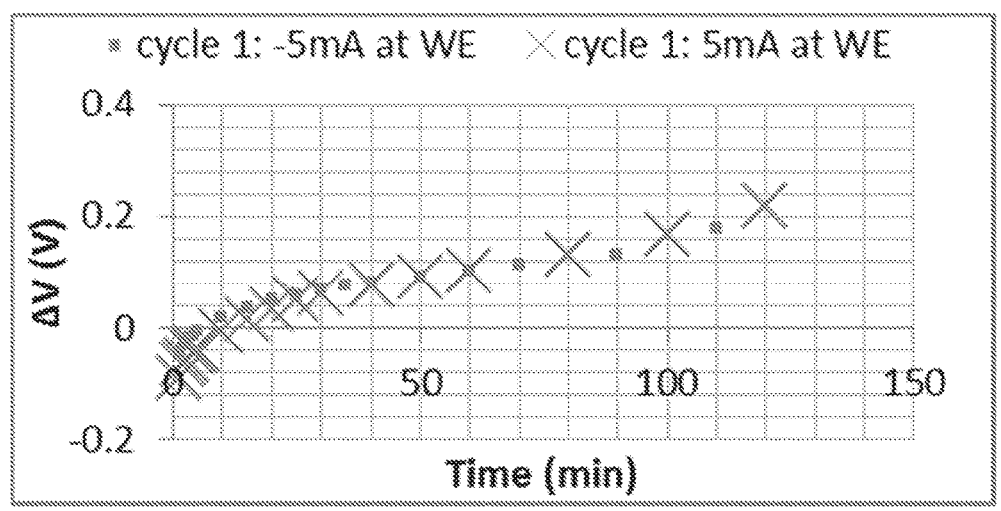
FIG. 14 is a plot illustrating the excess potential vs. time in the first two steps depicted in FIG. 10. The excess potential was measured as the potential difference between the two Ni(OH)$_2$/NiOOH electrodes.

The potential difference between the Ni(OH)$_2$/NiOOH reactions, referred to as 'ΔV', was measured during the first cycle and the obtained data is presented in FIG. 14. The potential difference between the Ni(OH)$_2$/NiOOH reactions increase by 0.226V in the initial 110 minutes of measurement, after which a rapid increase in potential difference was observed. The rapid increase in potential is attributed to the complete discharge of the NiOOH electrode. The potential difference is considered as the excess potential (voltage) that should be supplied for driving the electrolysis reaction in the two-cell configuration.

Overall, the data presented herein demonstrate that water splitting can be conducted using a system with two separate cells where HER occurs in one cell and OER occurs in another cell, without a salt bridge connection between the two cells.

The process is based on the reversible reaction between β-Ni(OH)$_2$⇌β-NiOOH. In one cell hydrogen is produced on the Pt electrode along with hydroxide ions. These ions are taken in turn by the Ni(OH)$_2$ electrode placed within the same cell and Ni(OH)$_2$ is converted into NiOOH and releases an electron. The electron is transferred via a metal wire to the NiOOH electrode placed in the second cell. In the second cell, the NiOOH is converted into Ni(OH)$_2$ in a process producing hydroxide ions. These ions are taken up in the oxygen evolution reaction occurring on the Pt electrode in the same cell. The two Pt electrodes are connected to a DC power source, closing the electric network.

This process is effected while applying an external voltage which is comparable to water electrolysis in a standard single cell. A potential of 2-2.2 Volts was measured for a single-cell system as described herein, and a potential in a range of 2-2.6V is applied to the two-cell system as described herein. The excess potential assists in driving the Ni(OH)$_2$/NiOOH reactions, as Ni(OH)$_2$ converts to NiOOH at 1.45V$_{RHE}$ while NiOOH discharges at an average 1.35V$_{RHE}$.

Example 4

Water Electrolysis with Hematite Photo-Anode

An experiment was designed to compare a system with a single photoelectrochemical (PEC) cell to a 2-cell system as described herein. Linear-sweep measurements were done from 0.5 to 1.9 V in a 2-electrode configuration under dark and light conditions using solar simulator.

In the single-cell system, a hematite photo-anode, prepared by pulsed laser deposition on FTO-coated glass substrate as described in [Dotan et al. (2013) Nature materials, 12(2), pp. 158-164], was connected in a 2-electrode (2E) configuration with a Pt counter electrode (CE).

Figure 15:
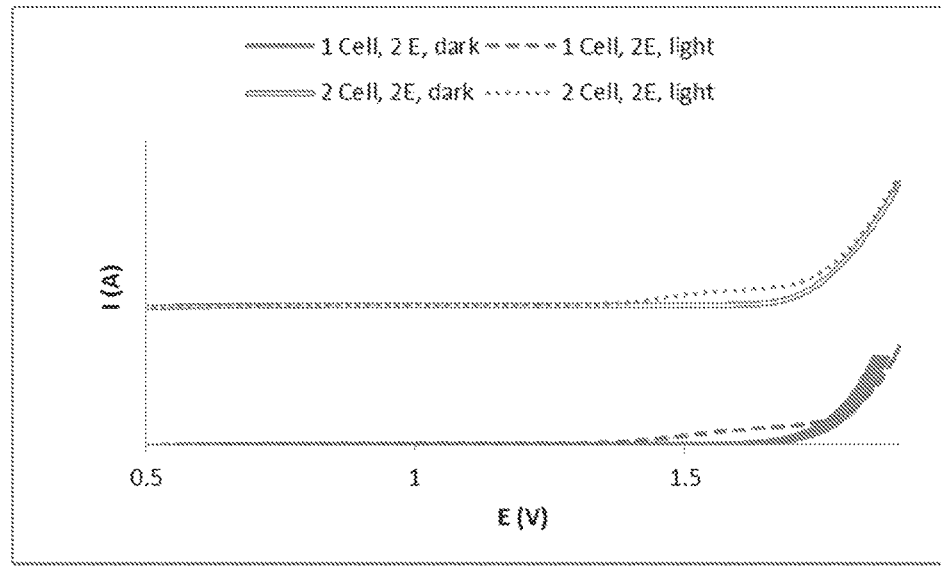
FIG. 15 is a plot illustrating current vs. potential in a photo-electrochemical system with a hematite photo-anode as the working electrode (WE) and a Pt counter electrode (CE), for a single-cell configuration and for a 2-cell configuration according to some embodiments of the present invention.

In the 2-cell system, one cell contained a hematite photo-anode and a Ni(OH)$_2$/NiOOH electrode which was precharged at 5 (mA)×2.5 (hours). Another cell contained a Pt electrode and a Ni(OH)$_2$/NiOOH electrode fully discharged. In a 2E measurement, the hematite and Pt electrodes were connected as the WE and CE, respectively. The data obtained in these measurements are presented in FIG. 15. As shown, the I vs. V data is almost identical for the 1-cell and the 2-cell systems. The minor differences can be attributed to the different geometric configuration between the systems.

Figure 16:
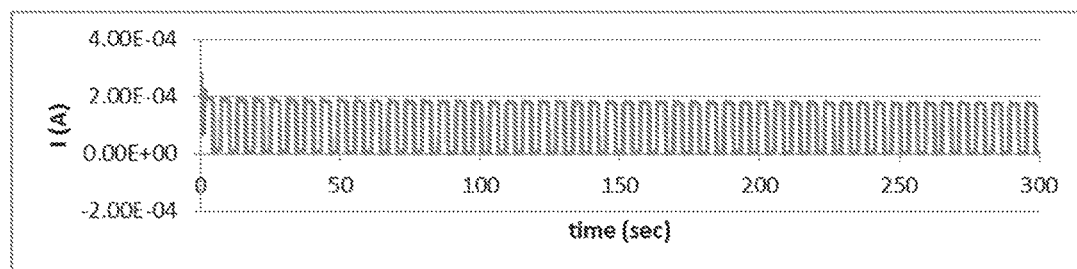
FIG. 16 is a plot illustrating current vs. time in a chronopotentiometric measurement in a photo-electrochemical 2-cell configuration according to some embodiments of the present invention with a hematite photo-anode as the WE and a Pt CE. The measurement was carried out at 1.6V under alternating dark and light exposures.

A chronopotentiometric measurement was carried out in the 2-cell system described above at alternating light/dark conditions for 300 s at 1.6V, and the obtained data is presented in FIG. 16.

Figure 17A:
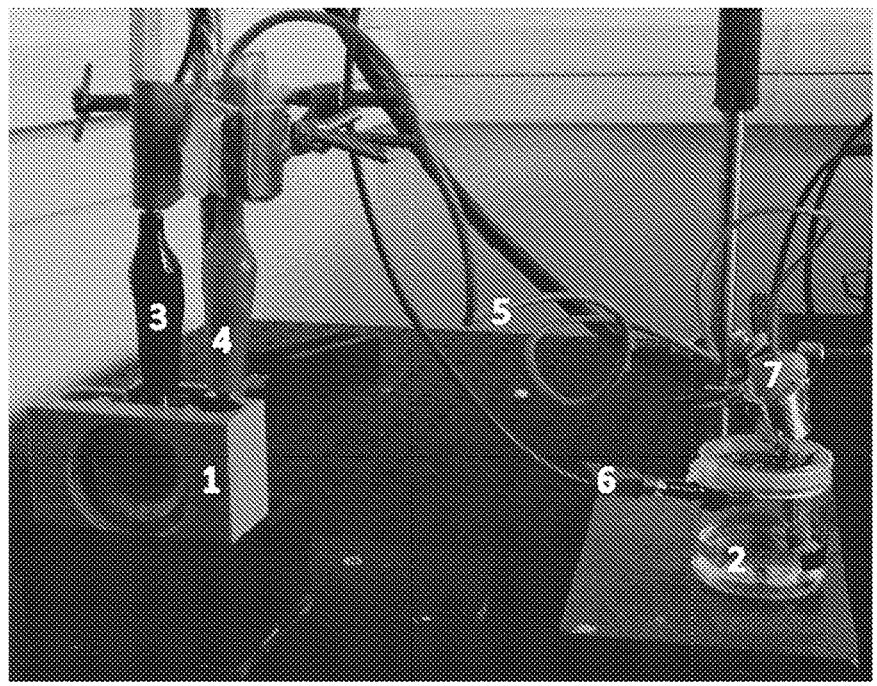
FIGS. 17A-C present photographs of a 2-cell system according to some embodiments of the present invention wherein water electrolysis is performed in two separate cells (FIG. 17A). Cell (1) containing a hematite photo-anode (3) as the WE and an accessory Ni(OH)$_2$/NiOOH electrode (4) connected through wire (5) to Cell (2) containing a Pt electrode (6) as the CE and an accessory Ni(OH)$_2$/NiOOH electrode (7).
Figure 17B:
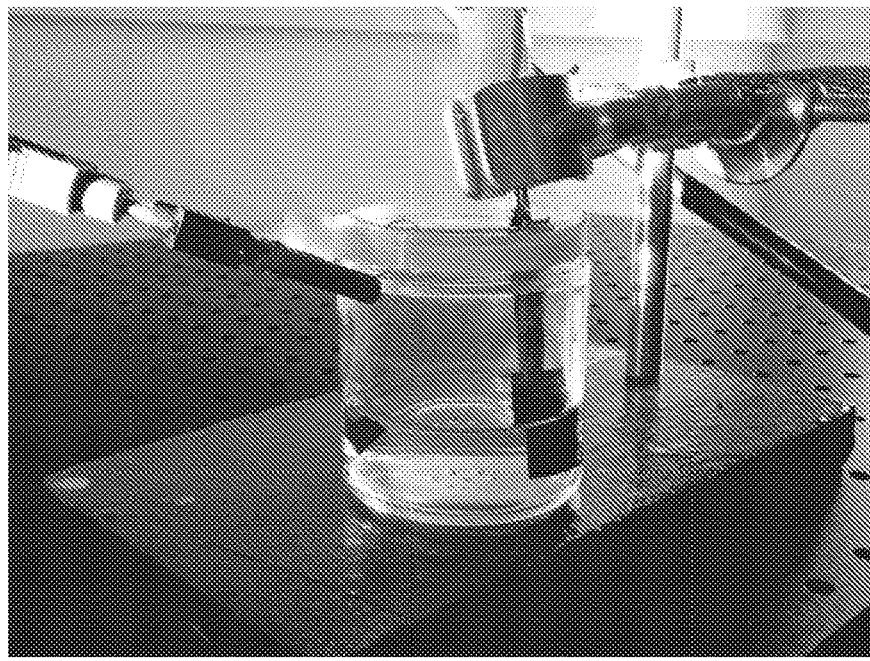
Figure 17C:
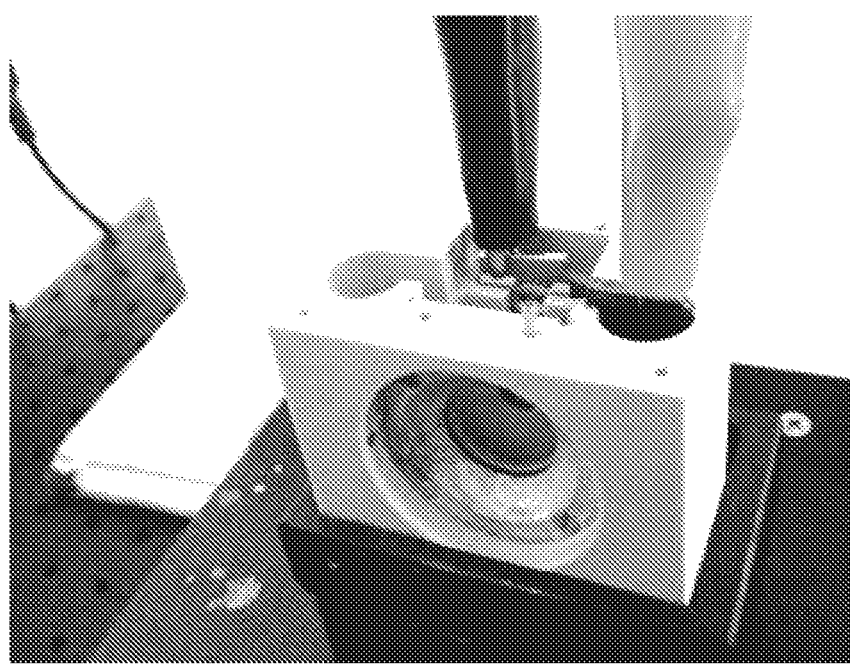

Photographs of an exemplary such system are presented in FIGS. 17A-C. FIG. 17A shows a system in accordance with the general scheme presented in FIG. 1, wherein cell (1) corresponds to container 60 in FIG. 1, and contains a hematite photo-anode (3) as working electrode 58 and a Ni(OH)$_2$/NiOOH electrode (4) as redox-active electrode 56 connected through wire (5) (corresponding to conductor 50) to cell (2) (corresponding to container 20) containing a Pt electrode (6) as working electrode 18 and a Ni(OH)$_2$/NiOOH electrode (7) as redox-active electrode 16.

Figure 18:
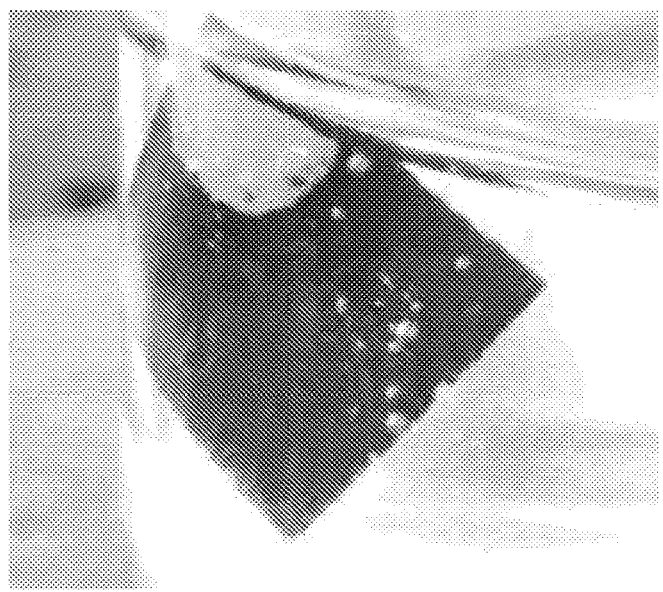
FIG. 18 is a photograph showing the formation of hydrogen bubbles on the Pt electrode in cell (2) depicted in FIGS. 17A and 17B.
Figure 19:
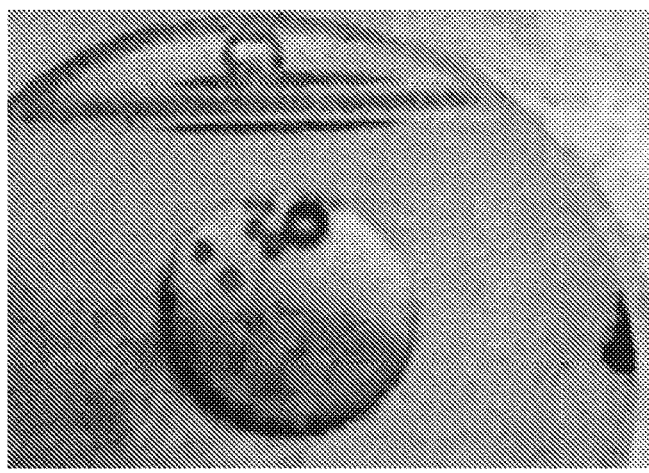
FIG. 19 is a photograph showing the formation of oxygen bubbles on the hematite electrode in cell (1) depicted in FIGS. 17A and 17C.

As shown in FIGS. 18 and 19, bubbles appeared on the WE and CE in the 2-cell system, indicating of hydrogen and oxygen evolution reactions.

Example 5

Single Cell Water Electrolysis with Separate Hydrogen-Generating Mode and Oxygen-Generating Mode A single-cell system was set up having the initial system configuration is schematically illustrated in FIG. 20A, with a nickel oxide/hydroxide electrode immersed in 1 M NaOH.

Hydrogen was visibly produced by applying a bias of 1.45 $V_{RHE}$ for 45 minutes. However, the reaction decayed as the nickel in the electrode is converted to nickel oxyhydroxide, resulting in a decrease in the visible hydrogen gas bubble formation and in the current flow (which is proportional to molecular hydrogen formation).

Figure 21:
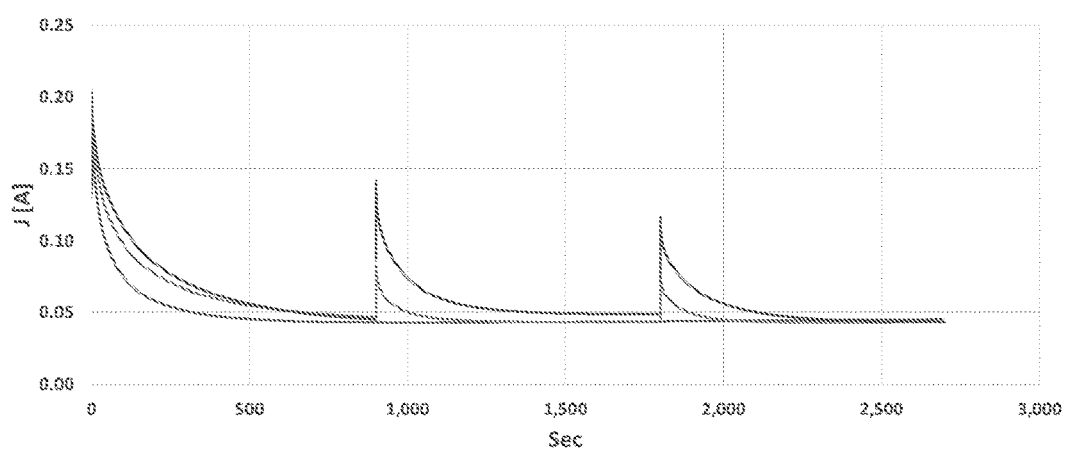
FIG. 21 is a graph presenting chronoamperometry measurements of a nickel oxide/hydroxide electrode according to some embodiments of the invention, showing current flow as a function of time upon immersion in 1M NaOH under an applied bias of 1.45V$_{RHE}$ for 45 continuous minutes (red) or for three 15 minute periods separated by 5 minute interruptions with (blue) and without (green) immersion of the nickel oxide/hydroxide electrode in hot (60° C.) 1 M NaOH.

As shown in FIG. 21, a 5 minute interruption effected by temporarily disconnecting the nickel oxide/hydroxide electrode (without potential drop) results in partial restoration of current flow, as determined by chronoamperometry measurements, and the partial restoration of current flow and hydrogen production was considerably greater when the nickel oxide/hydroxide electrode was immersed in hot (60° C.) 1 M NaOH.

Furthermore, bubble formation was clearly visible when the nickel oxide/hydroxide electrode was immersed in hot 1 M NaOH.

All measurements were done after conditioning and stabilizing the nickel oxide/hydroxide electrode redox potential to $1.35V_{RHE}$ (verified by OCP measurement).

Figure 20B:
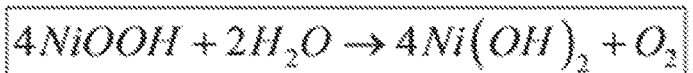
Figure 20B:
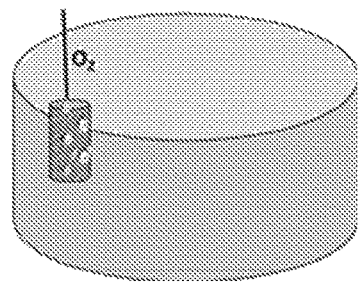

These results indicate that the nickel oxyhydroxide is unstable and decomposes to release oxygen gas, while regenerating nickel hydroxide, as is schematically illustrated in FIG. 20B.

The regenerative chemical reaction:

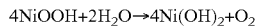

can be considered as set of two electrochemical reactions:

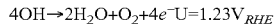

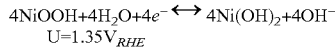

This means that electrons reacts with nickel oxyhydroxide and water to form nickel hydroxide and hydroxyl ions, this ions react and form water and oxygen, while providing back the electrons to continue the reaction. By doing so the system reduces its free energy by 120 meV per electron (which also means 120 meV per molecule), such that the reaction is a spontaneous reaction.

The above results further suggest that the rate of the regenerative reaction is considerably increased by moderately elevating the electrolyte solution temperature.

Example 5

Figure 22A:
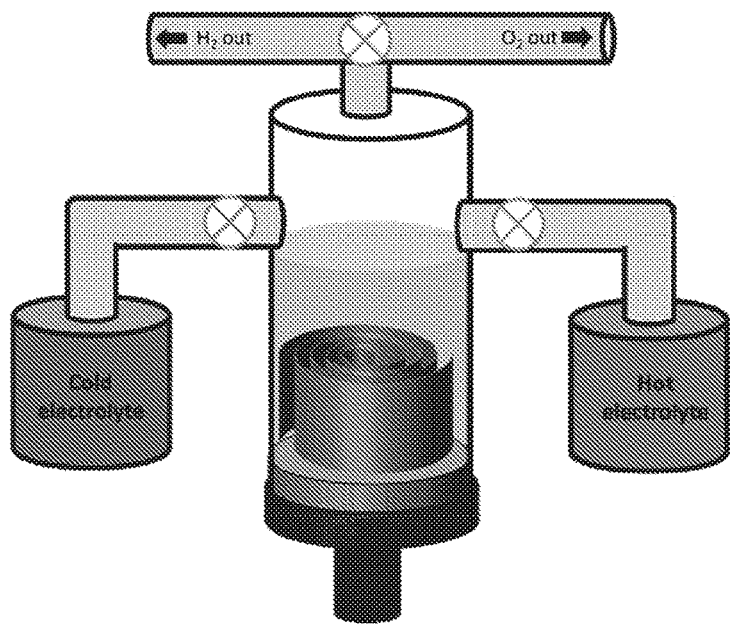
FIGS. 22A and 22B presents a schematic illustration of a single-cell system according to some embodiments of the present invention (FIG. 22A) and a pair of electrodes used in the system (FIG. 22B), comprising a nickel oxide/hydroxide electrode and an electrode for producing hydrogen ("Hydrogen electrode").
Figure 22B:
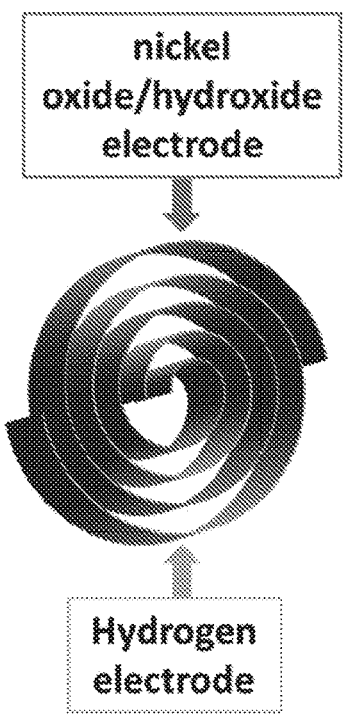

Scaled Up Single Cell Water Electrolysis with Separate Hydrogen-Generating Mode and Oxygen-Generating Mode An exemplary design of a scaled up thermal-electrochemical electrolyzer, presented in FIGS. 22A and 22B.

The thermal-electro-chemical electrolyzer consumes water and electricity and generates compressed hydrogen and oxygen. The principle of operation corresponds to that depicted in FIGS. 20A and 20B, as discussed in Example 5 hereinabove.

The electrolyzer is made from a main container (optionally a cylinder), which is connected to an exhaust and two electrolyte tanks (hot and cold) as depicted in FIG. 22A. Inside the main container, there is a piston that carries the active electrodes, depicted in greater detail in FIG. 22B.

The electrolyzer operates according to the following four steps:

1) Electrochemical hydrogen generation: Voltage (of about 1.5V) is applied between the hydrogen evolution electrode and the nickel oxide/hydroxide electrode. Hydrogen is generated and the pressure in the chamber increases. The chamber pressure is controlled by changing the chamber volume (by changing the height of the piston). This step continues until a significant part of the nickel oxide/hydroxide electrode is transformed into nickel oxyhydroxide.

2) Hydrogen compression and exhaust: By raising the piston, the hydrogen is compressed further and released as exhaust into a pressurized hydrogen tank. While doing so, the cold electrolyte is also released as exhaust to the cold electrolyte tank.

3) Chemical oxygen generation and exhaust: the piston is lowered while pumping into the chamber hot electrolyte from the hot electrolyte tank. The hot electrolyte speeds up the regeneration reaction in the nickel oxide/hydroxide electrode. In order to prevent oxygen pressure rise, which slows down the reaction, the oxygen is released as exhaust into an oxygen tank or into the environment, as needed. Replacing the electrolyte (which may cool down during the process) and exhausting the oxygen may optionally be performed by raising and lowering the piston as needed. This process continues until a significant part of the nickel oxide/hydroxide electrode is transformed into nickel hydroxide.

4) Preparation for the next cycle: By raising the piston, the remaining oxygen is released as exhaust. While doing so, the hot electrolyte is also released as exhaust to the hot electrolyte tank. Then the piston is lowered while pumping into the chamber cold electrolyte from the cold electrolyte tank, such that the system is ready for an additional cycle of steps 1-4.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A system for generating hydrogen gas from an aqueous solution, the system comprising:
   a non-partitioned compartment comprising a working electrode and a redox-active electrode;
   said compartment having an inlet configured for receiving an aqueous solution, and at least one gas outlet configured for controllably evacuating a gas from the compartment, said working electrode being configured to affect reduction of water in said aqueous solution in response to an applied electrical bias, to thereby generate hydrogen gas and hydroxide ions, and said redox-active electrode being capable of reversibly undergoing oxidation in the presence of hydroxide ions in said aqueous solution in response to the applied electrical bias, wherein said applied bias between the working electrode and redox-active electrode is at least 1.23V when measured at 25° C.

2. A system configured for alternate generation of hydrogen gas and oxygen gas from an aqueous solution, the system comprising:

a compartment comprising a working electrode and a redox-active electrode;

said compartment having an inlet for receiving an aqueous solution, and at least one gas outlet for controllably evacuating hydrogen gas or oxygen gas from the compartment, said working electrode being configured to affect reduction of water in said aqueous solution in response to applied electrical bias, to thereby generate hydrogen gas and hydroxide ions, said redox-active electrode being configured to reversibly undergo oxidation in the presence of the hydroxide ions in said aqueous solution in response to an applied electrical bias, and to undergo reduction to thereby generate oxygen gas in the absence of electrical bias, wherein said applied bias between the working electrode and redox-active electrode is of at least 1.23V when measured at 25° C.

3. The system according to claim 1, wherein the applied electrical bias between the working and redox-active electrodes is between 1.23 and 1.8 V when measured at 25° C., between 1.23 and 1.6 V when measured at 25° C. or between 1.23 and 1.5 V when measured at 25° C.

4. The system according to claim 1, wherein said redox-active electrode comprises nickel hydroxide ($Ni(OH)_2$).

5. The system according to claim 4, wherein the nickel hydroxide is transformed by oxidation to a nickel oxyhydroxide (NiOOH).

6. The system according to claim 1, further comprising a reservoir for receiving hydrogen gas from the gas outlet.

7. A method for generating hydrogen gas from an aqueous solution, in a non-partitioned cell, the method comprising applying an electrical bias of at least 1.23 V when measured at 25° C. between a working electrode and a redox-active electrode in said non-partitioned cell comprising an aqueous solution to cause reduction of water in said aqueous solution at said working electrode, to thereby generate hydrogen gas and hydroxide ions;

said redox-active electrode reversibly undergoing oxidation in the presence of the hydroxide ions and optionally applying a stimulation to said cell to cause the oxidized redox-active electrode to generate oxygen gas.

8. A method for generating hydrogen gas and oxygen gas from an aqueous solution in a cell, the method comprising applying an electrical bias of at least 1.23 V when measured at 25° C. between a working electrode and a redox-active electrode, said cell comprising an aqueous solution to cause reduction of water in said aqueous solution at said working electrode, to thereby generate hydrogen gas and hydroxide ions;

evacuate said hydrogen gas from the cell;

said redox-active electrode reversibly undergoing oxidation in the presence of hydroxide ions to obtain an at least partially oxidized redox-active electrode causing the at least partially oxidized redox-active electrode to undergo reduction by applying a stimulation to the cell in the absence of electrical bias, to thereby regenerate the redox-active electrode and generate oxygen gas.

9. The method according to claim 8 for continuous alternate generation of hydrogen gas and oxygen gas from an aqueous solution, the method comprising applying an electrical bias of at least 1.23 V when measured at 25° C. between a working electrode and a redox-active electrode in a cell comprising an aqueous solution, to cause reduction of water in said aqueous solution and generation of hydrogen gas and hydroxide ions said redox-active electrode reversibly undergoing oxidation in the presence of the hydroxide ions to obtain an at least partially oxidized redox-active electrode and causing the at least partially oxidized redox-active electrode undergo regeneration to evolve oxygen gas; and subsequent reduction of water in said aqueous solution and generation of hydrogen gas.

10. The method according to claim 7, wherein said stimulation comprises electric and/or thermal stimulation.

11. The method according to claim 7, wherein the generation of hydrogen gas is achieved under applied bias between the working electrode and the redox electrode between 1.23 and 1.8 V when measured at 25° C., between 1.23 and 1.6 V when measured at 25° C. or between 1.23 and 1.5 V when measured at 25° C.

12. The method according to claim 7, wherein the generation of oxygen gas is achieved in the absence of bias.

* * * * *